(12) United States Patent
Fallah et al.

(10) Patent No.: US 11,429,960 B2
(45) Date of Patent: Aug. 30, 2022

(54) NETWORK CONFIGURATION MANAGEMENT FOR NETWORKED CLIENT DEVICES USING A DISTRIBUTED LEDGER SERVICE

(71) Applicant: NXM LABS, INC., Mountain View, CA (US)

(72) Inventors: Jay Fallah, Toronto (CA); Kristopher Byrne, Toronto (CA); Kevin John Oerton, Waterloo (CA); Josef Zankowicz, Toronto (CA); Scott Rankine, Toronto (CA)

(73) Assignee: NXM Labs, Inc., Mountain View, CA (US)

( * ) Notice: Subject to any disclaimer, the term of this patent is extended or adjusted under 35 U.S.C. 154(b) by 363 days.

(21) Appl. No.: 16/451,560

(22) Filed: Jun. 25, 2019

(65) Prior Publication Data
US 2019/0333059 A1    Oct. 31, 2019

Related U.S. Application Data

(63) Continuation-in-part of application No. PCT/CA2019/050635, filed on May 10, 2019, and a continuation-in-part of application No. 16/183,254, filed on Nov. 7, 2018, now abandoned, and a continuation-in-part of application No. 15/988,427, filed on May 24, 2018, now Pat. No. 10,708,070.

(60) Provisional application No. 62/739,771, filed on Oct. 1, 2018, provisional application No. 62/689,303, filed on Jun. 25, 2018, provisional application No. (Continued)

(51) Int. Cl.
*H04L 29/06* (2006.01)
*G06Q 20/38* (2012.01)
*G06F 16/182* (2019.01)
*H04L 9/08* (2006.01)
*H04L 61/103* (2022.01)

(52) U.S. Cl.
CPC ..... *G06Q 20/3829* (2013.01); *G06F 16/1824* (2019.01); *G06F 16/1834* (2019.01); *H04L 9/0825* (2013.01); *H04L 61/103* (2013.01); *H04L 2209/38* (2013.01)

(58) Field of Classification Search
CPC .............. H04L 9/0825; H04L 63/0281; G06F 16/1824; G06F 16/1834; H04W 12/02
USPC ........................................................ 726/28
See application file for complete search history.

(56) References Cited

U.S. PATENT DOCUMENTS 9,965,628 B2   5/2018  Ford et al.
10,084,826 B1  9/2018  Irwan et al.
(Continued)

FOREIGN PATENT DOCUMENTS

EP          3676744 A1    7/2020

*Primary Examiner* — Longbit Chai
(74) *Attorney, Agent, or Firm* — Hodgson Russ LLP

(57) ABSTRACT

A system and method for managing a plurality of network-enabled client devices such as networking equipment and Internet of Things (IoT) devices which employs a distributed ledger, or blockchain, to store network configuration information for each client device. Access to the distributed ledger may be provided through a proxy computing system that is configured to exchange control messages with the client devices. Network configuration information is defined in smart contracts stored in the distributed ledger which are executed on registration of the network-enabled client device in the distributed ledger.

21 Claims, 16 Drawing Sheets

Related U.S. Application Data

62/669,652, filed on May 10, 2018, provisional application No. 62/583,231, filed on Nov. 8, 2017, provisional application No. 62/510,269, filed on May 24, 2017.

(56) References Cited

U.S. PATENT DOCUMENTS

| | | |
|---|---|---|
| 10,104,077 B1 | 10/2018 | Irwan et al. |
| 10,270,770 B1 | 4/2019 | Irwan et al. |
| 10,326,802 B1 | 6/2019 | Irwan et al. |
| 10,581,865 B1 | 3/2020 | Irwan et al. |
| 10,630,702 B1 | 4/2020 | Irwan et al. |
| 10,713,727 B1 | 7/2020 | Floyd et al. |
| 2017/0075941 A1 | 3/2017 | Finlow-Bates |
| 2019/0018863 A1 | 1/2019 | Wu |
| 2019/0245699 A1 | 8/2019 | Irwan et al. |
| 2019/0245856 A1 | 8/2019 | Irwan et al. |
| 2019/0373472 A1* | 12/2019 | Smith ................ H04L 9/3239 |
| 2020/0267138 A1 | 8/2020 | Irwan et al. |

* cited by examiner

NETWORK CONFIGURATION MANAGEMENT FOR NETWORKED CLIENT DEVICES USING A DISTRIBUTED LEDGER SERVICE

CROSS-REFERENCE TO RELATED APPLICATIONS

This application is a continuation-in-part of International Application No. PCT/CA2019/050635 filed on May 10, 2019 designating the United States and claiming priority to U.S. Provisional Application No. 62/669,652 filed May 10, 2018; U.S. patent application Ser. No. 15/988,427 filed May 24, 2018; U.S. Provisional Application No. 62/689,303 filed Jun. 25, 2018; and U.S. Provisional Application No. 62/739,771 filed Oct. 1, 2018. This application is also a continuation-in-part of U.S. application Ser. No. 16/183,254 filed Nov. 7, 2018, which claims priority to U.S. Provisional Application No. 62/583,231 filed Nov. 8, 2017. This application is also a continuation-in-part of U.S. patent application Ser. No. 15/988,427 filed on May 24, 2018, which claims priority to U.S. Provisional Application No. 62/510,269 filed May 24, 2017. This application further claims priority to U.S. Provisional Application No. 62/739,771 filed on Oct. 1, 2018 and to U.S. Provisional Application No. 62/689,303 filed on Jun. 25, 2018. All the foregoing applications are incorporated herein by reference. This application also incorporates the entirety of U.S. Provisional Application No. 62/669,652 filed on May 10, 2018 herein by reference.

TECHNICAL FIELD

This disclosure relates to management of networked devices, and in particular to the use of distributed ledger (blockchain) services to configure network-enabled client devices.

TECHNICAL BACKGROUND

With the proliferation of Internet-enabled consumer devices (such as so-called "smart" devices or "Internet of Things" devices) and networking equipment, the burden of deploying, maintaining, and protecting computing devices and networks has increased enormously. This is evidenced by recent reports of vulnerabilities in smart home products, enabling unauthorized parties to gain access to private information or launch distributed denial of service (DDoS) attacks. These vulnerabilities can be exacerbated by a user's failure to properly configure the smart device or their local network equipment. Furthermore, the proliferation of networked devices also challenges the scalability of existing frameworks for managing these devices, all of which must be provisioned for communication over wired or wireless networks, and in some cases, cellular networks; configured, patched, and updated periodically; and, to some degree, tracked for security and accounting purposes.

BRIEF DESCRIPTION OF THE DRAWINGS

In drawings which illustrate by way of example only embodiments of the present invention.

DETAILED DESCRIPTION OF THE INVENTION

Figure 1:
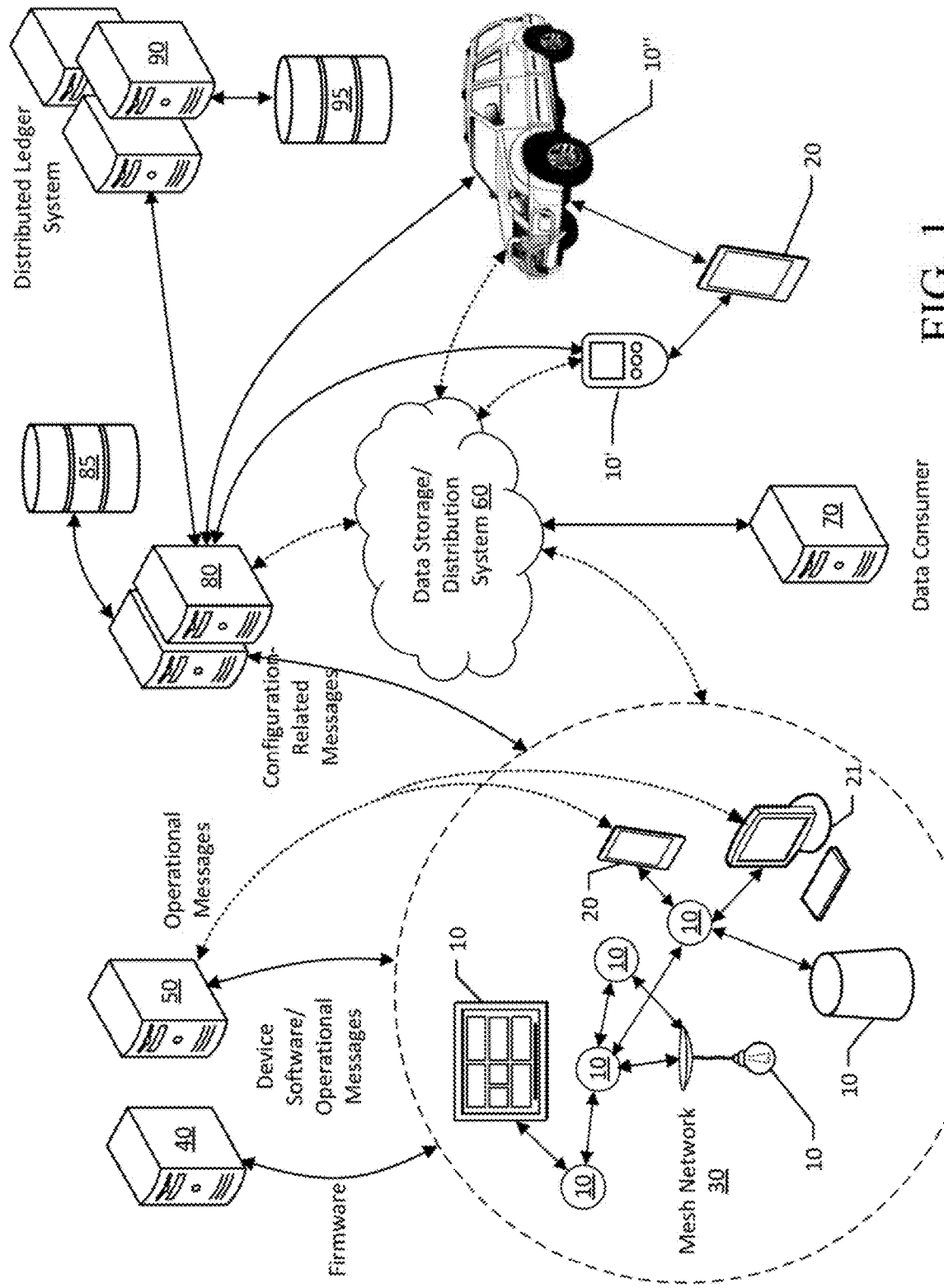
FIG. 1 is an illustration of an example networked environment in which a distributed ledger system and proxy system may operate.

The embodiments and examples herein generally provide a framework for the management of network-enabled client devices, including networking equipment, that facilitates provisioning and administration of client devices on wired and wireless networks, while also maintaining an auditable record of security information for the client devices and associated administrator and user devices. The framework governs onboarding, registration, pairing, configuring, permissioning, and other processes using information maintained in a distributed ledger (such as a blockchain). Each device managed in the framework is assigned an immutable unique identity (UID) that uniquely identifies the device within the distributed ledger. Client devices interface with the distributed ledger through a proxy service platform that receives control messages and either queries the distributed ledger or implements transactions or smart contracts on the distributed ledger in order to manage security policies and configuration information on the client device's behalf. The proxy service platform may also use the distributed ledger as a form of authentication service to determine whether requests received by a client device or another device are valid.

In one aspect, the embodiments and examples herein provide a method for configuring a networking device, the method comprising storing, in a distributed ledger, a smart contract defining network configuration information for the networking device, the networking device being in an unconfigured state when initially deployed in a network; after the networking device is deployed in the network, registering the networking device in the distributed ledger and executing the smart contract; and transmitting output from execution of the smart contract for receipt by the networking device, the output comprising the network configuration information for the networking device.

In another aspect, the smart contract is executed in response to the networking device invoking the smart contract. Further, the smart contract may be executed in response to a proxy system associated with the networking device invoking the smart contract, and wherein transmitting output comprises transmitting the output to the proxy system for forwarding to the networking device.

In a further aspect, the method further comprises storing, in the distributed ledger, a further smart contract to the distributed ledger altering the network configuration information; executing the smart contract; and transmitting output from execution of the smart contract for receipt by the networking device, the output comprising altered network configuration information for the networking device.

In still a further aspect, the networking device is comprised in a first set of networking devices and a second networking device is comprised in a second set of networking devices, the first set and the second set comprising a same type of networking devices, and the smart contract defines network configuration information for networking devices in each of the first set and the second set, and the method further comprises: after the second networking device is deployed in the network, registering the second networking device in the distributed ledger and executing the smart contract; and transmitting output from execution of the smart contract for receipt by the second networking device, the output comprising the network configuration information for the second networking device, wherein the network configuration information for the networking device and the networking configuration information for the second networking device are different.

In a further aspect, the network configuration information comprises at least one of a traffic policy, a quality of service policy, a network address, an Address Resolution Protocol table, or a routing table.

There is also provided a networked computing system implementing a distributed ledger comprising at least one processor configured to implement the method aspects provided herein.

In a further aspect, there is also provided a method implemented in a networking device, the method comprising, after deployment in a network, requesting registration of the networking device in a distributed ledger maintained in a distributed ledger platform; receiving, from the distributed ledger platform, network configuration information, wherein the network configuration information is output from execution of a smart contract in the distributed ledger; and applying the received network configuration information.

In one aspect, the networking device invokes the smart contract, or the networking device transmits a request to a proxy service, the proxy service being configured to invoke the smart contract on behalf of the networking device.

In another aspect, receiving the network configuration information comprises the networking device receiving the network configuration information from the proxy service.

In a further aspect, the network configuration information comprises at least one of a traffic policy, a quality of service policy, a network address, an Address Resolution Protocol table, or a routing table.

There is also provided, in another aspect, a networking device comprising a processor configured to implement the methods disclosed herein.

"Client devices", in this context, include but are not limited to devices conventionally referred to as "smart devices" or "IoT devices". In particular, "client devices" includes any suitable computerized device provided with a radiocommunication subsystem or a wired connection, enabling the device to either communicate over a network, which may be a public network, such as the Internet, or to communicate with another device that forwards messages over a network on its behalf. "Smart" or IoT client devices designed for specialized purposes may less powerful processors than personal communication devices and other devices equipped for more general purposes such as smartphones and personal computers, so as to reduce the cost of manufacture. In some cases, client devices may also have minimal user interfaces, since their main purpose may simply be connection of sensor data (e.g., temperature, humidity, speed, location), and perhaps the control of another device based on the sensor data and/or instructions received from a user device over a network (e.g., a thermostat controllable by a user's smartphone). On the other hand, some client devices contemplated by this disclosure can be complex and more powerful. For example, a vehicle that is equipped for network communication may be considered to be a client device. Furthermore, a client device need not be a consumer device or terminal equipment. The client device can include a networking device (also referred to as "networking equipment") such as a router, bridge, modem, firewall, network interface controller, access point, switch, or any other type of networking equipment employed in mediating, communicating, or routing data between two other communication or networking devices. For ease of reference, in most of the examples below client devices tend to be characterized as consumer devices or endpoints in a network, rather than intermediate networking equipment. Those skilled in the art will understand, however, that other types of client devices may be substituted where appropriate, with suitable modification to the systems and methods described below.

An example topology of a networked environment in which these inventive concepts may be implemented is illustrated in FIG. 1. It will be appreciated by those skilled in the art that the examples described and depicted herein are not intended to be limiting, and are simply intended to illustrate the inventive concepts. Client devices 10, such as the devices discussed above, may operate in a wireless mesh network 30, although this is not necessary. For example, client devices may communicate over a local or wide area network using fixed or wireless connections. The example mesh network 30 depicts a plurality of consumer devices, such as a thermostat, smart speaker, and light fixture operating as nodes in the network. As will be seen in the following discussion, each client device 10 is associated with at least one user device, which operates as an administrator device 20. One such device is shown in the mesh network 30. A single administrator device 20 may be used to administrate multiple client devices 10, but a given client device 10 in the examples provided herein has only one associated administrator device 20 at a time. Additionally, one or more secondary user devices 21 may be associated with a given client device 10, with approval received from the administrator device 20. A user device 21 is provided with a subset of permissions to operate the client device 20.

Firmware, applications, and software for the client devices and administrator devices may be made available for retrieval over the public network from firmware sources 40 and software sources/application servers 50. For example, the original equipment manufacturer or a distributor may make firmware files available for download by a client device 10 when the device is first activated, as described below. Various mechanisms for hosting and delivering firmware and software updates will be known to those skilled in the art.

Generally, administrator device 20 may be any suitable user communication/data processing device configured for network communications and capable of communicating (typically, over a wireless connection) with the client device 10, with a user interface such as a display screen or speech interface enabling the user to implement various control actions relating to the client device 10. The user device 21 may be the same type of user communication/data processing device. The examples of the administrator device 20 and user device 21 are not intended to be limiting. In other contexts, particularly in industrial or commercial settings, devices 20, 21 may be special purpose computing devices. When the client devices 10 include networking equipment, the administrator and user devices 21 may be general purpose computing devices. It is contemplated that in the context of household or workplace consumer client devices, the administrator device 20 and user devices 21 will typically be a smartphone, personal computer (e.g., a desktop or laptop computer, or a tablet computing device), or even a smart speaker. As mentioned above, such devices would be provisioned with software applications, which may be downloaded from a client device manufacturer or vendor site or other software source such as an online software marketplace, represented generically by software source/application servers 50. The software applications are executed by the device 20, 21 to enable the device 20, 21 to register in the system and obtain authority over one or more client devices 10, and may be referred to below as a device control application. Each type of client device (e.g., each device model or class of device models) may be associated with a specific device control application, or each vendor may provide a proprietary device control application for use with client devices supplied by that vendor.

In such implementations, messages containing operational commands may be transmitted by the administrator or user device 20, 21 directly to the client device 10 via peer-to-peer (P2P) messaging, or alternatively, the operational commands from the device 20, 21 may be routed to an application server 50, which then transmits a message with the operational command to the client device 10. An operational command is a command directed to the operation of the device, for example to turn the device on/off or alter operational parameters. In the case of a smart thermostat client device, for example, operational commands may include setting a target room temperature or defining a scene. The devices 20, 21 may also transmit security or access-related commands via the application server 50, for example to add users who are permitted to operate the client device 10, but as will be seen below, to provide an enhanced level of security, security-related and/or network administration-related commands are managed using the distributed ledger.

In a typical household implementation, devices on the mesh network 30 communicate with any accessible external nodes (e.g., services accessible over a public network such as the Internet) via an access point and Internet gateway. Other example client devices 10' and 10" shown in FIG. 1 are a blood glucose monitor and an automobile, respectively, with a common administrator device 20. These devices are illustrated as operating outside a mesh network, although of course those skilled in the art will recognize that a network communication-enabled automobile may be configured for communication in ad hoc mesh networks, for example using a vehicle-to-vehicle (V2V) protocol. These devices may be adapted for wireless local area network (WLAN) communication and may communicate with the distributed ledger proxy system 80 and other accessible nodes in the environment in a manner similar to the example mesh network 30. They may, alternatively, be configured with suitable radio access technology compliant with one or more cellular communications standards such as $5^{th}$ generation (5G), as may be defined by the Third Generation Partnership Project (3GPP) or International Mobile Telecommunications-2020 (IMT-2020) Standard, or earlier (fourth to second generation) standards such as Long Term Evolution (LTE), Universal Mobile Telecommunications System (UMTS), or Global System for Mobile Communications (GSM). In the case of a client device 10 that is expected to be mobile during the course of day-to-day operation (e.g., a vehicle or a personal medical device), it may be preferable for the client device 10 to be equipped for cellular communications unless it is accompanied by a paired communications device with cellular access, such as a smartphone. The network infrastructure required for these communication methods is omitted for clarity in FIG. 1. Also, as mentioned above, the client devices 10 may not utilize a mesh network; in household or in enterprise implementations, the client devices 10 may include networking equipment configured for communication in a local area network (LAN) or wired local area network (WLAN).

The client devices 10 and administrator devices 20 communicate, typically over a public network, with a distributed ledger proxy computing system 80. Briefly, the proxy system 80 operates as an intermediary between the client devices 10 and a distributed ledger (e.g., blockchain) computing system 90, enabling client devices 10 to use the distributed ledger system 90 without requiring the client devices 10 to engage in resource-intensive operations. Functions of the distributed ledger proxy system 80 are discussed in further detail below.

The distributed ledger proxy system 80 is configured to transmit requests (e.g., smart contract or function calls, transactions, etc.) to a distributed ledger system 90. The distributed ledger system 90 in these examples is a networked set of distributed ledger client computing nodes implementing a suitable distributed ledger software module for maintaining an instance of a distributed ledger. Appropriate platforms include Hyperledger, available from The Linux Foundation, or Ethereum, which is available from the Ethereum Foundation, and implementations of these platforms include IBM Hyperledger Fabric; Parity Ethereum from Parity Technologies; Hyperledger Sawtooth, a project of Hyperledger hosted by The Linux Foundation); and Infura from ConsenSys Inc. Other appropriate platforms and infrastructures known to the person skilled in the art may be employed. Selection of one particular platform over another may be determined, at least in part, by the capacity of the infrastructure to handle the volume of traffic anticipated when managing the client devices, which may number in the millions or billions. Selection may also be determined at least in part by a desired consensus algorithm, if any is used (e.g., proof of authority versus proof of work versus proof of stake). In the particular implementations discussed below, for enhanced security the distributed ledger is private, rather than public, and because the participating distributed ledger nodes are known to each other, a consensus algorithm may not be required.

As will be seen in greater detail in the various implementations described below, only the proxy system 80 is permitted to directly access the distributed ledger system 90 over a private channel. While the client devices and administrator devices may communicate with the proxy system 80 over a public network or cloud computing system (preferably using encryption, and optionally signed messages), communication between the proxy system 80 and the distributed ledger system 90 is preferably secured and private, and the distributed ledger system 90 is preferably maintained as a private system with suitable firewall protection and physical security. This limited access protects confidential information stored in the distributed ledger from inadvertent exposure in the event a client device 10 is compromised. Additionally, one or both of the proxy system 80 and the distributed ledger system 90 may include additional data storage systems 85, 95.

In this example environment, the distributed ledger is used to track and store security-related and/or network administration-related information such as registered devices, pairings, and public keys, and optionally sensitive information, such as personal identifying information, relating to a device or the owner of the device. While the distributed ledger may also be used to store other types of information generated by the device 10, it is contemplated that the sensor or operational data generated by a client device 10 may be transmitted to a separate data storage and/or distribution system 60, where it may be made accessible to data consumers 70 for their own use. This sensor or operational data may be considered to be "vendible" data—that is to say, data aside from security-related or personal identifying information data, that is generated or collected by the client device 10 during the course of its operation that is generally consistent with the purpose of the device 10. Network administration-related data may be considered to be vendible data or not. The client device 10 may optionally transmit this "vendible" data to the data storage and/or distribution system 60 directly over a private or public network; but alternatively, as will be seen with reference to FIG. 5, vendible data is transmitted by the client device 10 to the proxy system 80, which routes vendible data to the data storage and/or distribution system 60. In this manner, as explained below, the vendible data can be, in effect, anonymized, and also aggregated for reporting and research purposes with minimal concern that personal identifying information has been included. Aspects of the systems and methods described below thus facilitate compliance with privacy laws and regulations, such as the United States *Health Insurance Portability and Accountability Act of 1996*; the European Union *General Data Protection Regulation*; and the Canadian *Personal Information Protection and Electronic Documents Act*, among others.

In the example network environment of FIG. 1, all client devices 10 are associated with a single distributed ledger proxy system 80 and distributed ledger, regardless of any logical or physical groupings of the client devices 10, device type, or vendor. For example, client devices 10 using the same proxy system 80 and distributed ledger may be located in different households, municipalities, countries, or organizations and include devices or machines as diverse as smart lighting and automobiles, manufactured and sold by different suppliers and vendors. In some implementations, segmentation may be desirable. Separate distributed ledger proxy servers 80 and distributed ledger systems 90 may be used for client devices in different countries, to facilitate compliance with privacy laws. A government organization using the system may wish to segregate its client devices from consumer devices. In that case, a separate network environment with a distinct distributed ledger proxy server 80 and distributed ledger platform 90 may be established for that organization. As another example, it may be desirable to locate a distributed ledger proxy server 80 closer to the edge of the network while still employing the same distributed ledger; for example, a single proxy server 80 may serve a neighborhood or municipality, or a specified class of client device 10 (e.g., vehicles versus household devices). If necessary, interactions among the multiple proxy servers 80 and the distributed ledger system 90 may be handled by a supervisory layer. In some implementations, where the distributed ledger is intended to serve a smaller set of devices in a network environment (e.g., only those devices within an enterprise or household) the distributed ledger platform and proxy server may be co-located at a single device (e.g., networking equipment) in the network environment. The device hosting the distributed ledger and server may also be a client device 10 as well.

Figure 2:
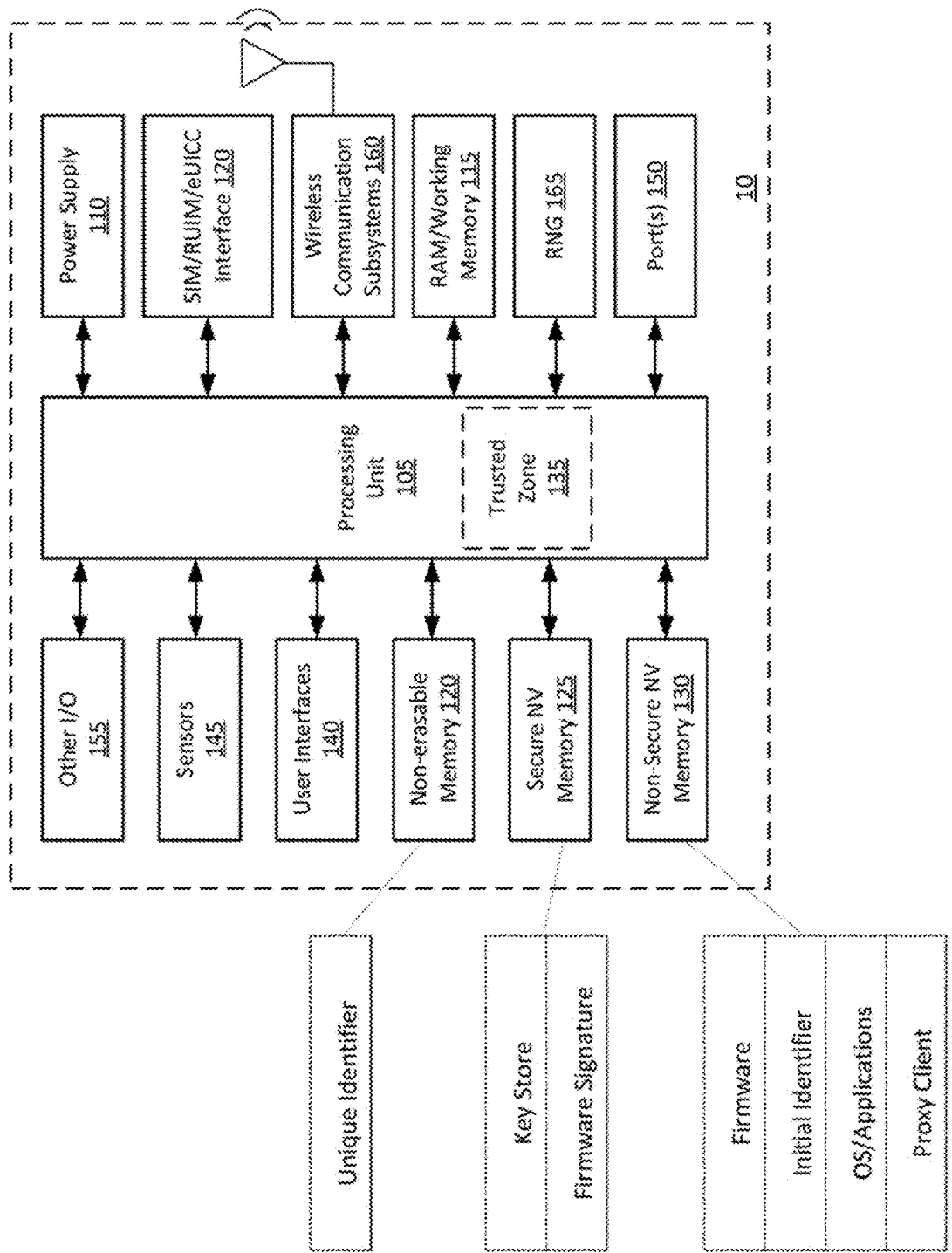
FIG. 2 is a block diagram illustrating select functional components of an example client device operating in the environment of FIG. 1.

FIG. 2 is a schematic depicting possible functional components of a generic client device 10. It will be appreciated by those skilled in the art that network-enabled client devices suitable for use in the system described herein can range from small, single-purpose devices, such as a thermometer or humidity sensor, to complex machines with multiple sensor and control systems, such as an automobile. They may be equipped for different types of radiocommunication, ranging from Bluetooth to 5G cellular communication. Thus, while FIG. 2 illustrates select functional elements of a client device 10, those skilled in the art will appreciate that a given client device may include fewer elements than those depicted in FIG. 2, or may in fact include more functional elements.

The device 10 includes a processing unit, such as a microprocessor 105. Preferably, for enhanced security, the processing unit 105 includes a trusted zone providing a trusted execution environment for sensitive code, such as code for generating a unique identifier (UID), discussed in further detail below, or cryptographic algorithms (encryption, decryption, key generation). The processing unit 105 may also include a hardware true random number generator component (TRNG), or the TRNG may be included as in the client device 10 in a separate integrated circuit 165. The client device also includes a power supply 110 (e.g., mains power or battery); volatile memory 115; non-volatile memory, in this example non-erasable memory 120, secure non-volatile memory 125 (this may form part of the trusted zone), and non-secure volatile memory 130. Non-erasable memory 120 is used to store the UID once it is generated, uniquely identifies the client device within the distributed ledger. This UID is generated once for the client device and is permanently assigned. The secure memory 125 may be used to store the client device's key store, in particular the client device's own private asymmetric key(s), and optionally its own and other devices' public keys, although these public keys may be maintained in a key store in the non-secure memory 130. The non-secure memory 130 may store the device firmware, including cryptographic algorithms; an initial identifier (which may be a manufacturer-assigned identity, and is discussed below); the operating system or device applications; and a proxy client module, which is used by the client device 10 to interface with the proxy system 80. A signature or cryptographic hash of the firmware may be stored in the secure non-volatile memory 125 for verification purposes. Additionally, a backup copy of firmware may also be stored in non-volatile memory.

Depending on the purpose of the client device 10, the device may be provided with various user interface mechanisms 140, such as, but not limited to a display screen, touchscreen, switches, buttons, touchpads, keypads, and so on. As noted above, some client devices have minimal interfaces and may only be equipped with simple controls or interfaces, such as an on/off button, or a light-emitting diode. The client device 10 may also be equipped with one or more sensors and location subsystems 145, such as a global positioning system module, an accelerometer, thermometer, ambient light sensor, microphone, camera, and the like. These sensors or subsystems may be used to generate operational or sensor data that is used to control other device functions, or for distribution to others. The client device 10 may also include various other input/output subsystems 155 and network and/or data ports 150, such as Ethernet and USB ports.

Many client devices 10 are configured for wireless network communication. Thus, the device may be provided with one or more wireless communication subsystems 160 adapted for communicating over a network or direct link using one or more protocols, including Wi-Fi™, Bluetooth™, near-field communication (NFC), Zigbee™, and the like. In some implementations, as mentioned above, the client device 10 is configured to communicate over a cellular network, and would be equipped with a suitable radio communication subsystem. Frequently, access to a cellular network requires an association of the client device 10 with a subscriber of the cellular network service. Thus, the client device 10 may include an identity module, such as a Subscriber Identity Module (SIM), Removable User Identity Module (RUIM), an embedded Universal Integrated Circuit Card (eUICC), or an embedded SIM (eSIM) as represented by SIM/RUIM/eUICC interface 120. In some implementations, SIM functionality may be built into the processing unit 105 (e.g., an integrated SIM (iSIM), available from Arm Limited.

FIG. 2 depicts the sensor modules, applications, etc. in a unitary device with those features that are required to access the proxy system 80, such as the wireless communication systems 160 and proxy client. In some implementations, however, an existing computerized device may be converted to a client device (in the vernacular, made "smart" or IoT-enabled) by connecting an installable client module (not shown in the drawings) to the existing device to supply the missing functional elements required to interact with the proxy system 80. For example, a vehicle may be equipped with cellular network access and sensors, but may not be provisioned with suitable firmware, a proxy client, or cryptographic algorithms. The missing functional elements may be provided in a separate client data processing module that can be connected to the vehicle using an existing data port (e.g., USB).

Each client device 10 is provided with at least one initial identifier that is used to identify the device for the purpose of initial steps in onboarding the device in the network as discussed below. The initial identifier may be based on a manufacturer's identifier, such as a serial number applied by an original equipment manufacturer. In some cases, the initial identifier may be the International Mobile Equipment Identity number (IMEI), or possibly a media access control (MAC) address. This value is stored in non-volatile memory of the client device 10, and as discussed with reference to FIG. 9 below, is used when a device 10 is initially onboarded in the network.

The client device 10 may also be provided with a further or administrative identifier that is used for identification purposes by other client devices 10 and/or administrator and user devices 20, 21. As this administrative identifier is intended to be detectable by users or other devices as in the example of FIG. 11, depending on the user and communication interface capabilities of the client device 10, the administrative identifier may be rendered in a human or machine-perceivable form on an exterior of the client device 10, or may be stored in non-volatile memory and transmitted to the recipient user or device. For example, a smart inventory tracking device may only have a light emitting diode array that functions as a user interface, with no display screen or audio output. The administrative identifier may then be provided in the form of a two-dimensional barcode on the tracking device's exterior. However, if the tracking device includes a short-range radio communication module, such as a near-field communication (NFC) module, the tracking device may transmit the further identifier via NFC if the receiving device is NFC-enabled. As another example, a smart speaker can include a display screen as well as a speaker, and may transmit the administrative identifier to a user for manual entry in the other device by presenting the administrative identifier either visually or audibly. The administrative identifier may thus be a rendering of the value of the initial identifier in a different format and/or medium (e.g. a 2D rendering of the initial identifier), but because it is the same value may be considered to be the same as the initial identifier. In some cases, the administrative identifier may have a different value from the initial identifier.

As will also be seen below, each client device 10 also generates a unique identifier (UID) that is not necessarily related to the initial identifier, the administrative identifier, or any other predefined device identifier. This UID is used to identify the client device 10 for the purpose of distributed ledger transactions, and may also be used to identify a discrete source of client device-generated data as discussed below with reference to FIG. 5, without linking the client device-generated data to a specific client device 10 or operator of the client device 10. Administrator and user devices 20, 21, are also provided with UIDs, but these UIDs may be generated in a different manner than client device UIDs.

Figure 3:
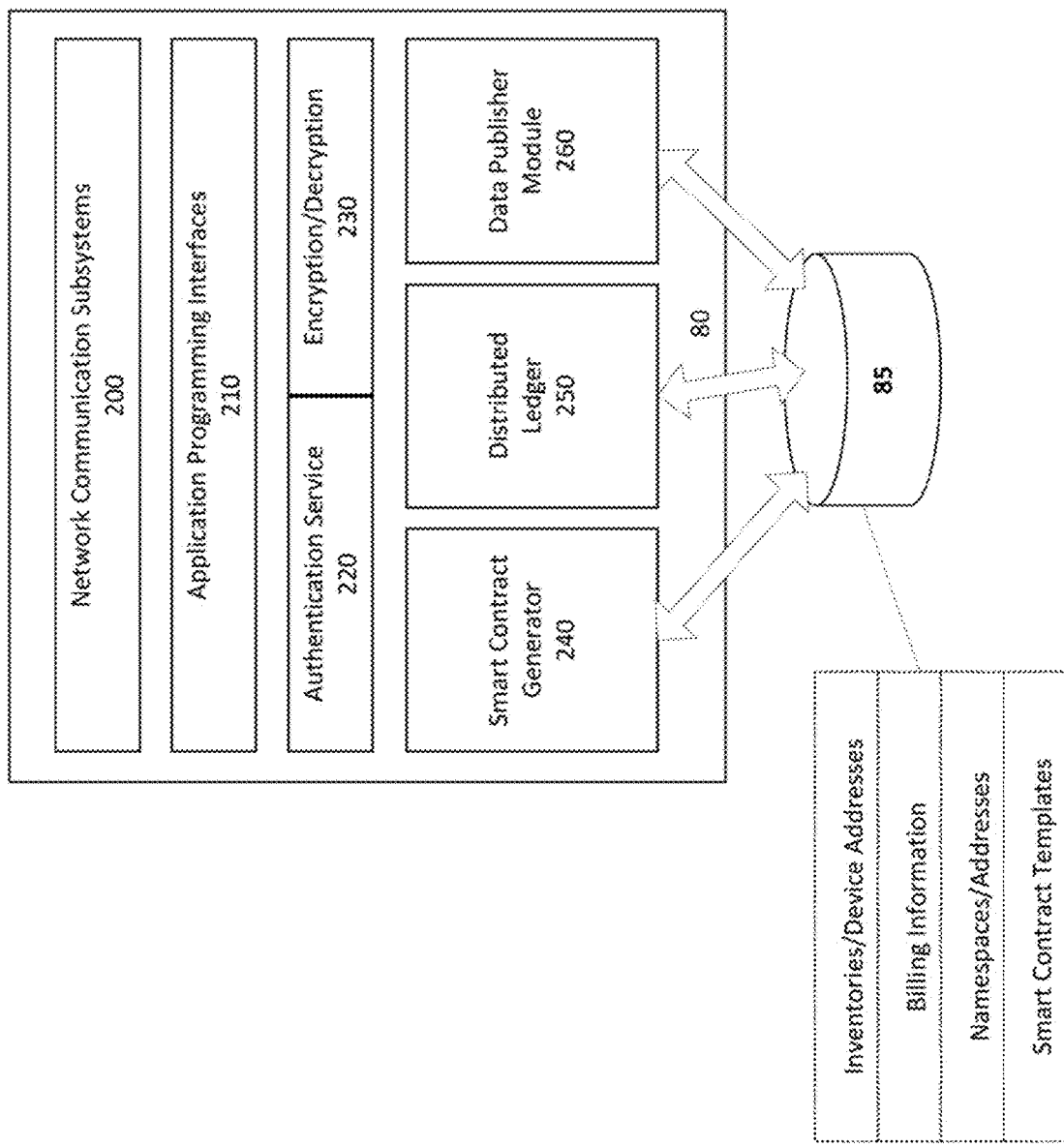
FIG. 3 is a block diagram illustrating select functional components of an example distributed ledger proxy system.

FIG. 3 is a schematic depicting select functional components of the distributed ledger proxy system 80. Briefly, in the examples set out in this disclosure, the proxy system 80 operates a service or plurality of services over a network for client devices 10 relating to security and data management. Thus, the proxy system 80 includes one or more communication subsystems 200 for communicating over various communication channels with the client devices 10, administrator and user devices 21, distributed ledger system 90 and, as will be seen below, optionally with a static copy of the distributed ledger; application programming interfaces (APIs) 210 addressable by client devices 10; and an authentication service 220 for validating requests received over the network, as well as an encryption/decryption module 230. The proxy system 80 also includes modules for carrying out specific tasks, such as a smart contract generator module 240 for generation of smart contracts or functions based on template code; a distributed ledger module 250 that generates transactions for transmission to the distributed ledger, or executes query functions to retrieve information from the distributed ledger or a static copy of the distributed ledger;

and a data publisher module 260, which handles incoming sensor or operational data generated by client devices, and generates messages or prepares the data for publication the data storage and/or distribution system 60. The template code mentioned above, as well as inventory information, device addresses, routing tables, billing information, namespaces or other address information for publishing data (as discussed below), are stored in the data storage system 85. Other possible functional modules of the proxy system will become apparent to the skilled reader on reading the following description.

While the various modules 200-260 of the proxy system 80 were depicted as subsystems within a proxy system 80, it will be appreciated by those skilled in the art that the various functions of these modules may be combined or allocated to different individual data processing systems within the proxy system 80. These functions may, moreover, be distributed across multiple servers and or computing systems. It will also be appreciated that while FIG. 3 illustrates select functional components of the proxy system 80, the selection and configuration of appropriate computing systems will be within the scope of the person skilled in the art.

Figure 4:
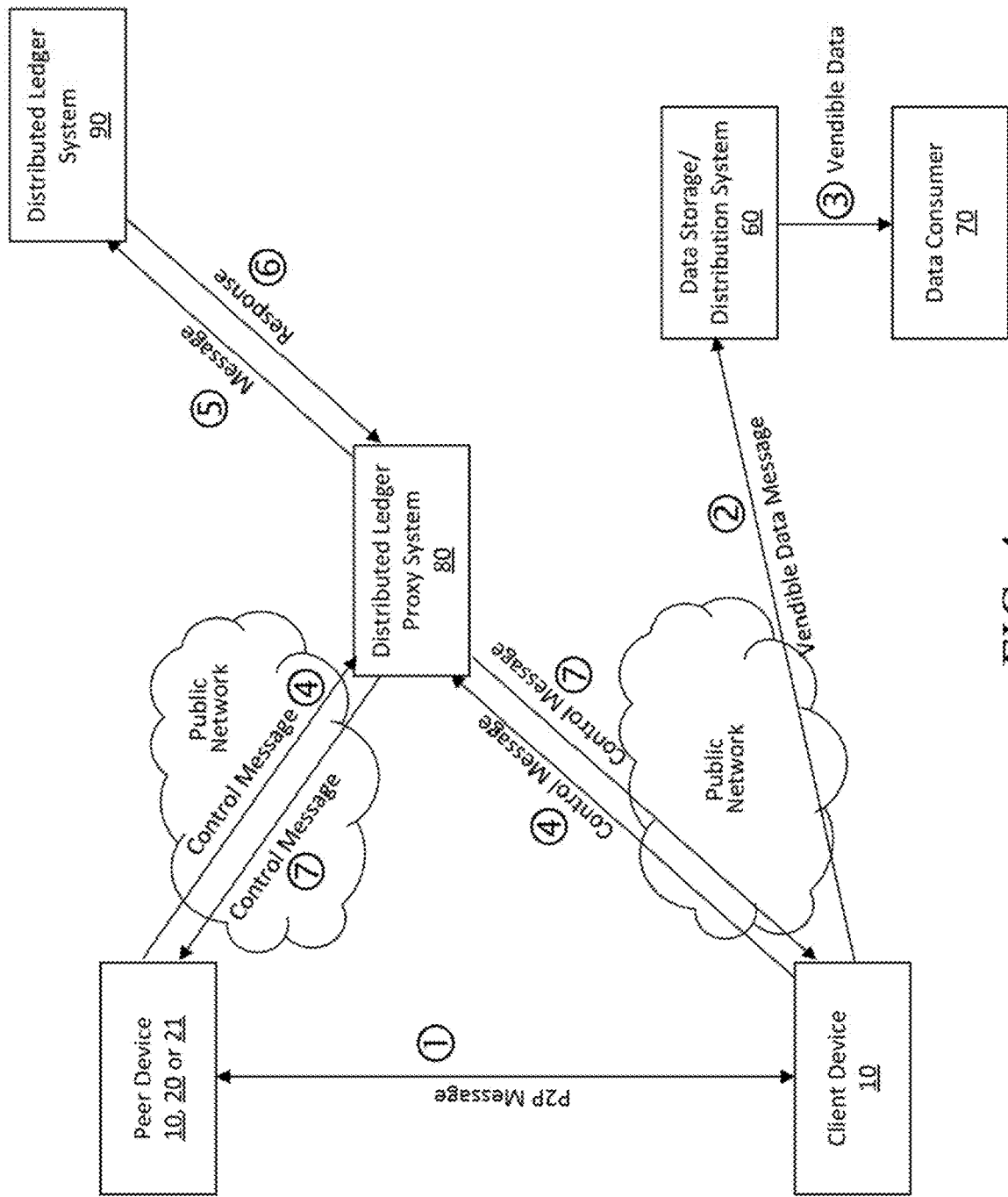
FIG. 4 is an interaction diagram illustrating a possible flow of control and data messages in a first configuration of the environment of FIG. 1.

As mentioned above, control messages and vendible data are routed from the client device 10 to the designated recipients along different communication paths, thus providing for separation of the control and data planes in the network. One example is shown in FIG. 4, which depicts communication amongst a client device 10, a peer device (e.g., another client device 10, and administrator device 20, or other user device 21), the proxy server 80, distributed ledger system 90, data storage and/or distribution system 60, and a data consumer 70. In this example, the client device 10 and peer device 10, 20, 21 may engage in P2P communication (path 1) using any appropriate wired or wireless technology and protocol (e.g., Zigbee™ or Bluetooth™). Vendible data collected by the client device 10 in this example is transmitted by the client device 10 via a public network (path 2) to the data storage and/or distribution system 60. Typically, the data will be addressed to a predetermined address defined in the client device's software or firmware. After it is received by the data storage and/or distribution system 60, the data may then be retrieved by the data consumer 70, or pushed or streamed to the data consumer. These transmissions may occur over a public or private network (path 3).

Control messages from the client device 10, administrator device 20, and/or user device 21, on the other hand, are typically routed via a public network to the distributed ledger proxy system 80 for handling over the public network (paths 4), for example via one or more application programming interfaces (APIs) defined for the proxy system 80. Control messages can include security, administrative, or ownership-related actions, such as, but not limited to, requests to register a device in the distributed ledger, obtaining public encryption keys, obtaining or verifying a UID for another device, reset encryption keys, trigger a firmware restore or update, add or remove a paired client device, add or remove a user, set permissions for a client device or user device, transfer the administrator role to a new device, and remove the administrator for the client device. For ease of reference, such actions are referred to as "security-related" actions, functions, or requests. Some security-related actions can also be considered to be network configuration-related actions, referred to herein as network administration-related actions, such as triggering a firmware restore or update, selection of encryption algorithms, or setting permissions. Other network administration-related actions can include defining traffic or quality of service (QoS) policies, assignment of Internet Protocol (IP) or other network addresses, defining Address Resolution Protocol (ARP) tables, configuring routing tables, installing or updating drivers, installing or updating antivirus programs, configuring cache management (with or without triggers) and so on. Control messages to the proxy system 80 may be structured in any suitable format (e.g., with prescribed length, fields, identifiers, etc.), but typically will include a type field indicating the type of request, and a payload comprising parameters for the request.

At the proxy system 80, the received control message is read; the parameters of the request are extracted, and the proxy system 80 generates a message for transmission to the distributed ledger system 90 using the parameters. The message may be structured as a transaction to be executed by the distributed ledger (e.g., to add or change a device's public key stored by the distributed ledger), a call, or invocation of a smart contract in the distributed ledger. As a brief example, a request received from an administrator device 20 to pair the client device 10 with another client device 10 may include, as parameters, the UIDs of each of the client devices, as well as other optional information. The proxy system 80 may then construct a transaction invoking a smart contract, using the UIDs as parameters to pass to the smart contract for execution on the distributed ledger. The UIDs may also function as the distributed ledger account identifiers for each device managed using the distributed ledger, which facilitates traversal of the distributed ledger to locate information about a given device 10, 20, 21.

As those skilled in the art understand, smart contracts are executable functions, but are referred to as "smart contracts" because their typical role in a blockchain is to execute business logic to verify or enforce the performance of obligations, usually involving a financial element. As will be appreciated from this disclosure, a smart contract need not be modeled on a traditional contract or be used to transact business; instead, a smart contract may be employed to perform a security-related or network administration-related function. Accordingly, in this disclosure "smart contract" is used interchangeably with "function" and "chaincode".

The message from the proxy system 80 to the distributed ledger system 90 is transmitted over a private communication channel, as mentioned above (path 5). Once the message is processed, in this example output from the distributed ledger is transmitted from the distributed ledger system 90 to the proxy system 80 (path 6). The proxy system 80 prepares and sends any responsive control message to the requesting device, again over the public network in this example (paths 7). It should be noted that a request from a device 10, 20, 21 for an action involving another device—for example, in the case of pairing, or granting/removing permissions—responsive messages may be transmitted to more than one endpoint involved in the action. The responsive control message may include a confirmation of the success or failure of the request, and on a successful transaction, the proxy system 80 may also transmit other security-related or network administration-related information to the endpoints, such as public keys for the newly paired client devices 10 so that the devices can initiate P2P communication.

Figure 5:
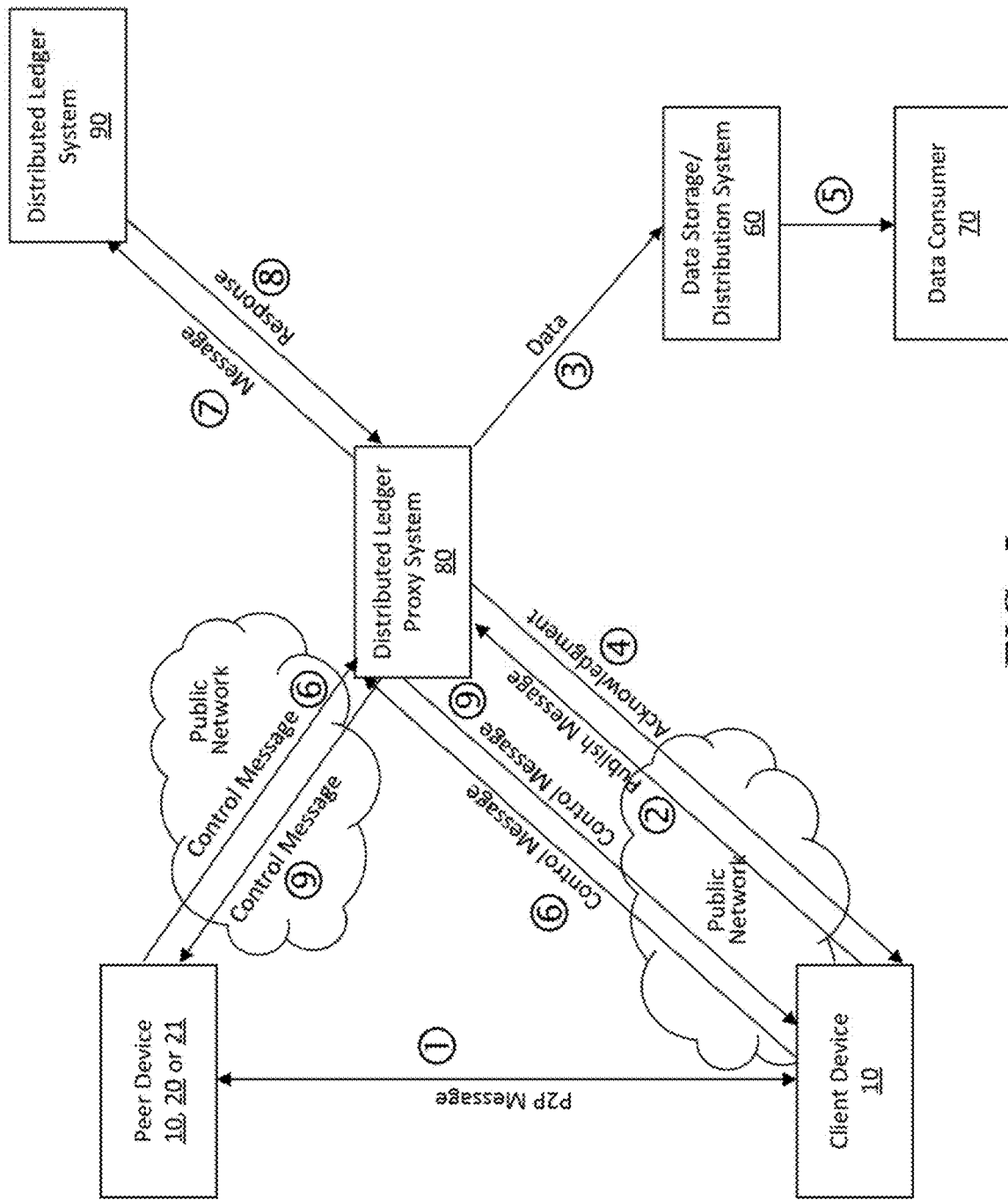
FIG. 5 is an interaction diagram illustrating a possible flow of control and data messages a further configuration.

FIG. 5 illustrates a further embodiment in which the proxy system 80 participates in the distribution of vendible data. In this example, P2P messages, control messages between the client device 10 and the proxy system 80, and messages between the proxy system 80 and the distributed ledger system 90 follow the same paths described in FIG. 4 (paths 1, 6, 7, 8, 9). However, in this implementation, vendible data is not transmitted by the client device 10 to the data storage and/or distribution system 60. Instead, the vendible data is transmitted to the proxy system 80 (e.g., using a different proxy system API), again in this example via the public network (path 2). The proxy system 80 may transmit an acknowledgement message to the client device 10 via the same network (path 4), and transmits the vendible data to the data storage and/or distribution system 60 over either a public or private network connection (path 3).

The proxy system 80 may repackage the data transmission to effectively anonymize the vendible data, for example removing any identifiers associated with the vendible data, or leaving only the UID described with reference to FIG. 9 below. The data storage and/or distribution system 60 can operate as a repository from which data consumers 70 can retrieve vendible data, according to any permissions defined for the data consumer. Alternatively, the data storage and/or distribution system 60 may distribute or stream the data to any subscribing data consumers 70, for example by acting as a broker employing a publish-subscribe-based messaging protocol such as Message Queuing Telemetry Transport (MQTT).

Distribution of vendible data may be granular according to various factors, such as the client device type, location, and type of vendible data. For example, the client device 10 may be a continuous blood glucose meter that generates glucose readings on a periodic basis, and operational data pertaining to the operational status of the device such as the time periods during which the monitor is in use (e.g., starting timestamp and duration), timestamps of calibration events, paired device type (but not necessarily the paired device identity), power status, and battery status. While the sensor data—i.e., the glucose readings and their associated timestamps—may be of interest to the patient and medical professionals, the operational data may be of more interest to a manufacturer who wishes to monitor the performance of their devices. Both types of vendible data may be routed from the client device 10, to the proxy service 80, to the data storage and/or distribution system 60, but may be divided at any point to separate the sensor data from the operational data so that only the sensor data is delivered to a subscribing medical data consumer and the patient, and the operational data is delivered to the manufacturer.

As another example, the client device 10 may be a client system connected to various sensors and subsystems in an automobile, collecting data on various sensor readings and/or operational information such as engine temperature, engine speed, vehicle speed, odometer, fuel level, environmental controls, seat belt indicators, headlight/hazard light use, geographic location, proximity of other vehicles, and so on. One subset of this data may be of interest to the manufacturer, while another subset may be of interest to a regulatory authority (e.g., a municipality or state) for monitoring, road studies, or enforcement purposes. Still further subsets may be of interest to an insurer and to an advertiser. The subsets of the data delivered by the client device 10 may be defined and delivered to each data consumer 70 (e.g., manufacturer, municipality, insurer, advertiser) accordingly. The creation of vendible data subsets for distribution to data consumers 70 may be facilitated by the use of a hierarchical namespace structure, such as that described in U.S. Provisional Application No. 62/739,771 filed on Oct. 1, 2018 and entitled "E-Commerce Namespace", the entirety of which is incorporated by reference.

Vendible data intended to be made available to a given data consumer 70 may be encrypted with the data consumer's public key to ensure that only the designated consumer can access the data. Encryption of the data may occur at the data storage and/or distribution system 60, or may be carried out in the proxy system 80 prior to transmittal to the data storage and/or distribution system. If the encryption is carried out at the data storage and/or distribution system 60 and the vendible data does not include any information permitting the data consumer 70 to attribute any vendible datum to an identifiable client device 10 or operator of the client device 10 (e.g., identifying data such as an IMEI or MAC address, but excluding the UID), the distribution of the vendible data is blinded: information passed through the network will not identify the data consumers 70 to the client device 10 or its operator, and the data consumers 70 cannot identify the client device 10 or its operator. This is because the UID, as will be seen below, can be derived from a random value and not derived from any identifier previously assigned to the client device 10. The association of the UID with the vendible data will only enable identification of sets of vendible data generated by a single device having that UID, but will not enable positive identification of the specific client device 10.

If the removal of the identifying information and encryption is carried out at the proxy system 80 prior to delivery to the data storage and/or distribution system 60, then the distribution of vendible data is still blinded, as the client device 10 will not be able to identify the data storage and/or distribution system 60 or data consumer 70 through a network transmission, and neither the data storage and/or distribution system 60 nor the data consumer 70 will not be able to identify the client device 10 or its operator.

The UID may be associated with personal identifying data within the distributed ledger system 90 or the data store 95, which is not publicly accessible. Thus, a data consumer 70 subscribing to vendible data published by the client device 10 (path 5) is unlikely to correlate the vendible data to an identifiable person or device without access to privately held data.

As mentioned above, a control message sent to the distributed ledger proxy system 80 can result in the generation of a transaction to be executed by the distributed ledger, such as an instruction to pair two client devices 10. The result of the executed transaction is a change in the state of the distributed ledger, in that the transaction, comprising information related to the new pairing, will be stored in a new block in the distributed ledger. In a simple example, each new pairing may be represented by a change to a JavaScript Object Notation (JSON) object. In this simple example, a device pairing for a given client device 10 may be represented by a key-value pair identifying the UID of the paired device. Similarly, the distributed ledger may also operate as a repository for public keys of devices 10, 20, 21, which may also be stored as objects in a transaction. Thus, once the transaction is committed to the distributed ledger, the proxy system 80 may the use the transaction number to look up pairing information, or to retrieve a public key, from the distributed ledger.

However, directly storing security-related or network administration-related information, such as encryption keys, may not be desirable since the volume of data to be stored—particularly if the distributed ledger is required to store information for millions or billions of client devices—will adversely affect the efficiency of the distributed ledger system 90. To reduce resource consumption, external storage solutions may be used in conjunction with the ledger, as represented schematically by data storage 95. The data storage may, in fact, be a separate distributed ledger; a separate central or distributed database; or a centralized or peer-to-peer file system. As the distributed ledger system 90 is private, the data storage system 95 is likewise private and accessible only by the distributed ledger system 90 using a private communication channel.

Figure 6:
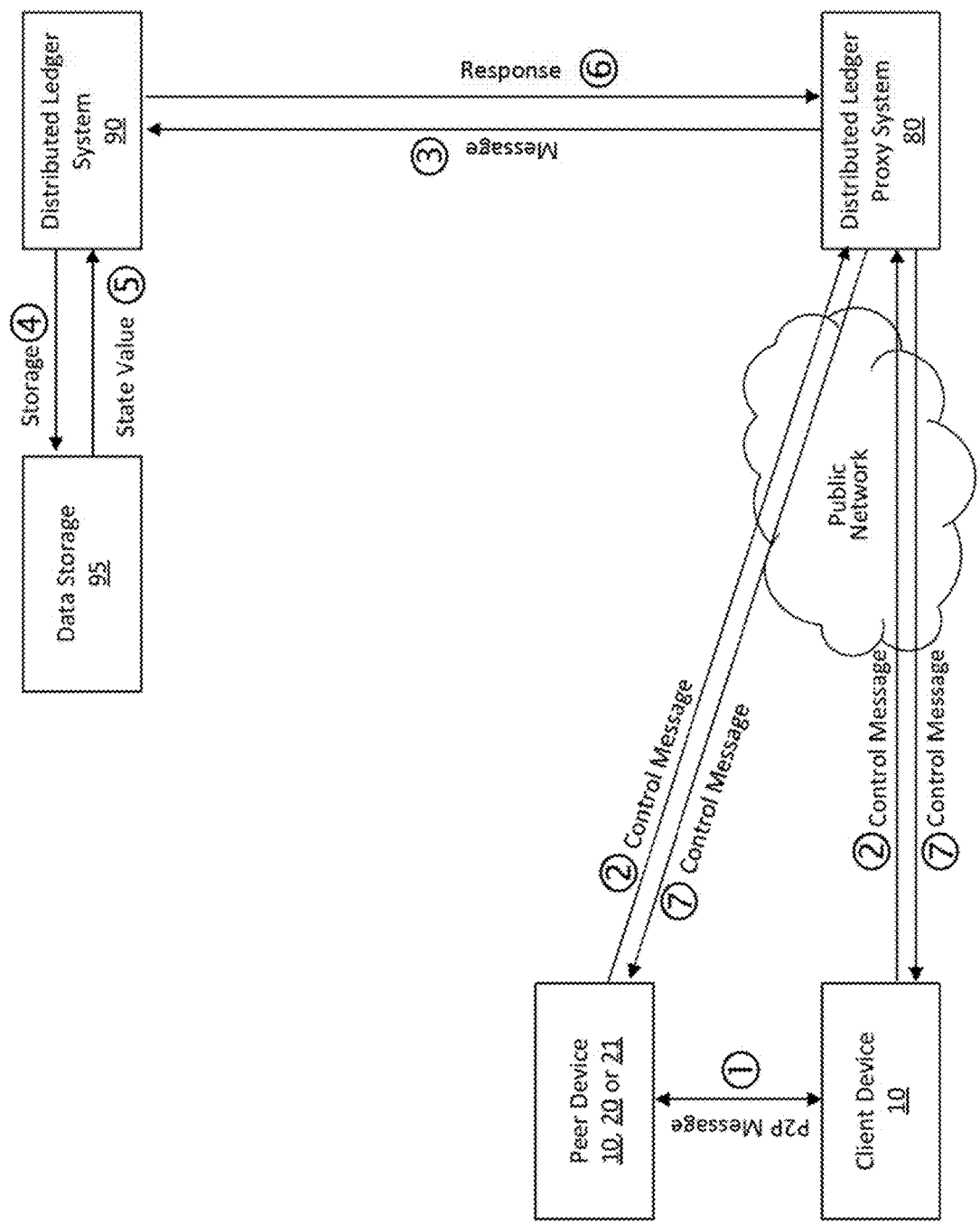
FIG. 6 is a further interaction diagram illustrating a possible flow of messages in a further configuration variant.
Figure 7:
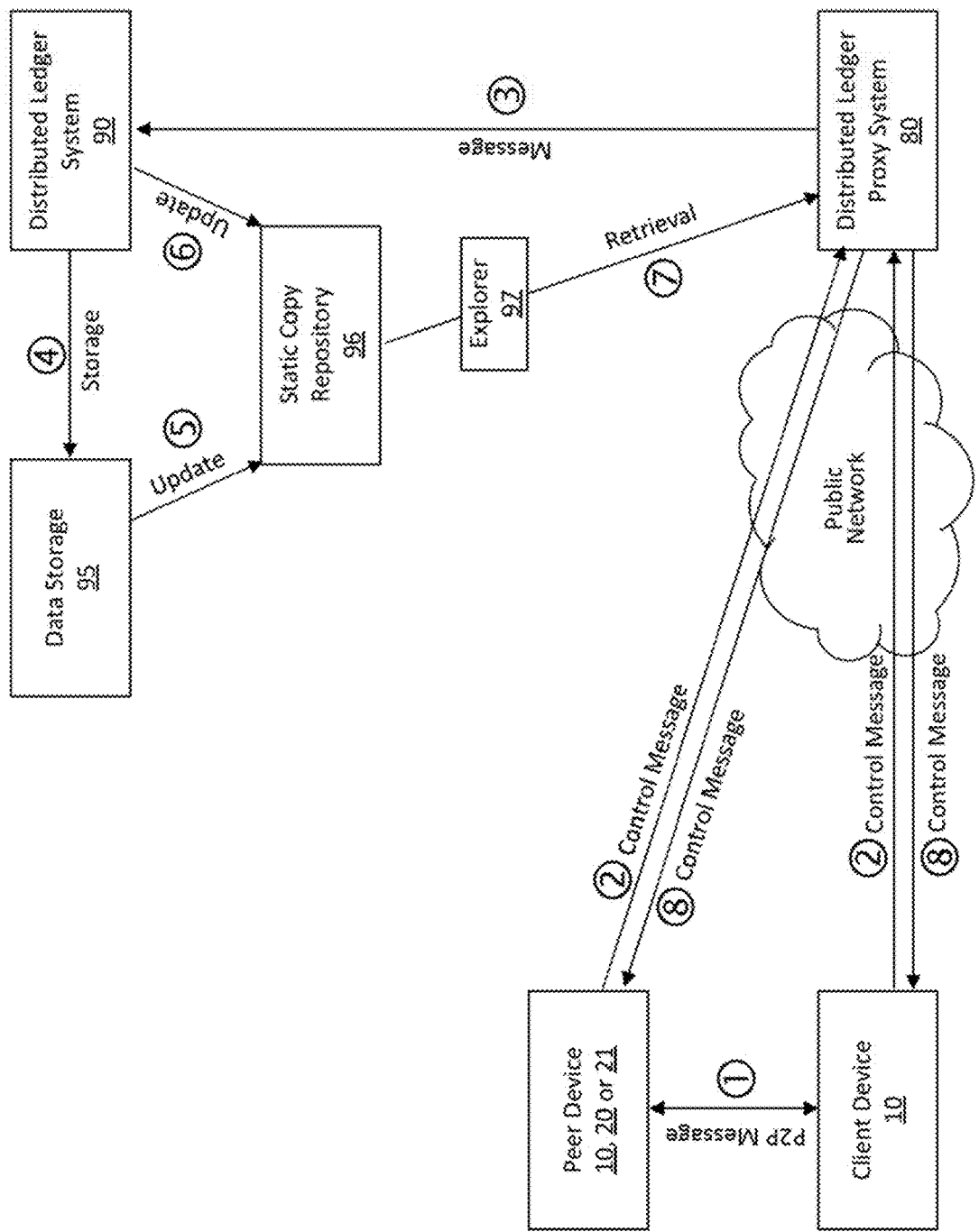
FIG. 7 is an interaction diagram illustrating a possible flow of messages employing an explorer module.

FIGS. 6 and 7 illustrate further example implementations of the network environment in which the private data storage 95 is used to store the security-related or network administration-related information (in FIGS. 6 and 7, security-related information is illustrated). In these examples, communications between peer devices 10, 20, 21 and the proxy system 80 pertaining to vendible data, and communications with the data storage and/or distribution system 60 and data consumer 70 are omitted for simplicity, but may occur as described above with reference to FIGS. 4 and 5. Turning first to FIG. 6, P2P messages, and control messages exchanged between the devices 10, 20, 21 and the proxy system 80, occur as described with reference to FIGS. 4 and 5 (paths 1, 2, 7). The control messages are likely routed through a public network. Messages from the proxy system 80 to the distributed ledger system 90 are sent via a private channel (path 3). If a state-changing event results from the message (i.e., a transaction is executed), the transaction is added in a new block in the distributed ledger. However, if data related to the transaction is to be stored, it is stored externally in the data storage system 95, which is private and accessible only within the distributed ledger system 90. For example, in the case where a new pairing between a client device 10 and another device is to be added to the distributed ledger, the transaction may call a function that creates or edits a JSON object for the client device 10 (and optionally, for the other device as well, which is also managed by the distributed ledger), and outputs the object to a compatible database or data structure maintained in the data storage 95 (path 4). If necessary for later retrieval, a reference value for the object can be stored in the transaction added to the distributed ledger.

Additionally, to provide immutability for the externally stored data, a hash value may be generated based on the state of the external database or data storage structure in the data storage 95. As one example, each time a change is made to the externally stored data, a hash of the data in the data store is generated and returned to the distributed ledger; the hash is a value representing the current state of the data store. The hash is then stored in the transaction as well. In the example of a JSON document, the data may be stored in a tree structure. Generating the hash may comprise traversing the tree from leaf to root to generate hashes for each node, where each node hash combines the hashes of its child nodes, if any.

Subsequently, if a smart contract or function call requires the distributed ledger to return information that was previously stored, such as a listing of paired devices or network configuration settings for a given client device 10, the last transaction associated with the client device's UID can be located in the distributed ledger and the reference value (if one was stored) obtained, the client device's data retrieved, and sent to the proxy system 80 in a responsive message. Either the distributed ledger system 90 may parse the retrieved data (e.g., JSON document) to extract the relevant data for transmission to the proxy system, or the proxy system 80 may be configured to parse the retrieved data to extract the relevant data.

A number of security-related or network administration-related actions may involve requests for data that do not actually require a transaction be added to the distributed ledger, such an administrator request for a list of paired devices or ARP table entries for a given client device. Other actions may involve a transaction as well as requests for data, such as a request to record a pairing between two devices, combined with a request for their public keys to facilitate key distribution. As shown in FIG. 7, to reduce the number of such requests for data directly from the distributed ledger a static copy of the distributed ledger (and the stored data in the data storage 95), not intended to execute transactions, can be stored in a separate data repository 96, and accessed via a browser or explorer module 97. The explorer module 97 may be similar to a blockchain or block explorer available for browsing blocks and transactions in a distributed ledger.

Thus, in FIG. 7, P2P messages between peer devices, and control messages exchanged between the devices 10, 20, 21 and the proxy system 80, occur as described above (paths 1, 2, 8). Again, messages between the devices 10, 20, 21 and the proxy system 80 are likely routed through a public network. Messages from the proxy system 80 to the distributed ledger system 90 are again sent via a private channel (path 3), and any data generated or altered as a result of a transaction in the distributed ledger may sent for storage in external data storage (path 4; reference and state values may be generated and stored, but are omitted here for simplicity). Each time the state of the distributed ledger or the externally stored data changes (e.g., each time a block is added to the distributed ledger, or each time the hash of the stored data changes), an updated copy of the ledger or stored data is provided to the static copy repository 96 (paths 5 and 6). The static copy may be co-located with a node of the distributed ledger system 90 and/or data storage system 95, or with the proxy system 80, or it may be hosted separately. An explorer module 97, which may be co-located with the static copy repository 96 or the proxy system 80 or located elsewhere, receives queries (not shown in FIG. 7) and provides requested information about individual blocks, transactions, UIDs (i.e., distributed ledger accounts), and/or externally stored information (path 7). As it is contemplated that the distributed ledger is a private distributed ledger, paths 4, 5, 6, and 7 may be private channels as well.

Returning to the example of a new pairing to be added to the distributed ledger for a given client device 10, in response to the transaction sent by the proxy system (along path 3) the distributed ledger system 90 may only transmit an acknowledgement (not shown); the resultant transaction recorded in the distributed ledger will appear in the updated static copy repository 96. The proxy system can then query the static copy repository 96 using the explorer 97 to discover the resultant transaction and obtain any new or changed data resulting from the transaction (path 7), then generate and transmit a responsive control message to a device 10, 20, 21 (paths 8). Those skilled in the art will appreciate that the use of the static copy repository 96 and explorer 97 reduces the number of request-response communications occurring on the same communication channel between the proxy system 80 and the distributed ledger system 97. This mitigates the risk of an eavesdropper or man-in-the-middle attack on the private channel.

The content of individual transactions in the distributed ledger and data in the data storage system 95 may be encrypted as well. If a static copy is used and the distributed ledger is used only for forensic and auditing purposes, then each transaction added to the distributed ledger can be encrypted with a public key of the static copy repository 96 or the explorer 97. When a request is made of the static copy repository via the explorer, the explorer 97 or the static copy repository 96, as the case may be, can decrypt the relevant transaction(s) and return the required information. Encrypting the distributed ledger in this manner further restricts access to the content of the distributed ledger.

In a further embodiment, a client, administrator, or user device 10, 20, 21 may be permitted to query the static copy repository 96 via the explorer 97. In that case, communications between the explorer and the device 10, 20, 21 may occur in part over a public network. In another variant, the static copy repository functions at least in part as a distributed ledger client system, permitting execution of smart contracts not involving a state change to the distributed ledger. This enables the proxy system 80 to call functions in the static copy of the ledger in the static copy repository 96 rather than the distributed ledger, further reducing the use of resources in the distributed ledger system 90. Thus, the distributed ledger operates as an immutable and authoritative ledger for use in forensic investigations or audits, and the static copy is used for most or all non-state-changing operations.

Messages exchanged between the various nodes in the system in all the examples described herein are preferably encrypted, and may be signed for additional security so that recipients can verify the origin of the message. Any appropriate encryption standard known in the art may be applied to a given communication path. For additional security, communications may be secured using a hybrid encryption algorithm that combines two or more encryption algorithms employing two or more keys; this may also include post-quantum cryptographic algorithms to secure data at rest (in particular) against future attacks.

Different devices or nodes in the system may employ encryption with different levels of cryptographic strength in a hierarchical arrangement, such that devices having control or authority over other devices employ stronger encryption than the governed devices. This may also be a result of the relative processing power of various devices. For example, it is generally contemplated that in the consumer context, an administrator or user device 20, 21 is likely to be a smartphone or other personal computing device, whereas the client device 10 will have lower processing power than the administrator or user device 20, 21. The administrator or user device 20, 21 may be capable of using longer encryption keys or more computationally-intensive algorithms than the client device 10. Therefore, for the purpose of communication between the administrator or user device 20, 21 and the client device 10, the administrator or user device may possess a public/private key pair of a length usable by the client device 10 for the purpose of establishing a secure channel (e.g., generating, encrypting and sending a symmetric key for a messaging session) and signing messages; but for storing data in the administrator or user device 10 or for control messages exchanged with the proxy system 80, which likely has a processing unit with more computational power than the administrator or user device 20, 21, the administrator or user device employs longer key lengths and/or more complex algorithms. Similarly, the proxy system 80, the distributed ledger system 90, data storage system 95, and static copy repository 96 and/or explorer 97 in turn, may employ even longer key lengths and/or more complex algorithms when exchanging messages and when storing data. This hierarchy of cryptographic strength mitigates the risk of an attack on a component of the system through a compromised lower-ranking device. For example, if a client device 10 is compromised, it cannot be used to decrypt data stored in an administrator or user device 20, 21, proxy system 80, or distributed ledger system 90; and even if it procured its administrator device's private keys, it could not forge administrator messages to the proxy system 80, because it would not be able to use the longer private key to sign the message. Similar logic applies to a compromised administrator or user device 20, 21, or a compromised proxy system 80. Key lengths, encryption standards, and algorithms may be defined in security policies provided to the various devices 10, 20, 21 when they are onboarded or registered in the system.

Denial of service attacks on the system can be further mitigated through the use of token (which can be the same as cryptocurrency) based metering, which may be implemented in a manner analogous to Ethereum gas, even in a distributed ledger system (e.g. Hyperledger) that may not require the use of gas. For example, the proxy system 80 may control a faucet, i.e. source of tokens. When a new device 10, 20, or 21 is registered on the distributed ledger, the proxy system may allocate a certain amount of tokens to the device from a balance it maintains in the distributed ledger. This may occur through execution of a smart contract during registration; in exchange for the device's public key, a token value is allocated to the device's account (as identified by its UID). Thereafter, each transaction sent to the distributed ledger on behalf of a requesting device includes a token value to be spent by the requesting device. If the requesting device's account does not have sufficient tokens to meet the specified value, the transaction fails. If the requesting device does have sufficient tokens, the transaction is completed and the tokens are transferred to the proxy system 80's account, or another account. Subsequently, the requesting device's account can be replenished from the faucet, which can be configured to replenish a given account, or any account, at a predefined rate to mitigate a denial of service attack.

The token value for a given request may be set arbitrarily, and may depend on the complexity of the request. The initial amount of tokens allocated to the device, and the faucet's output, may be defined according to the number of requests expected to be received from the device. For example, if it is expected that a device will typically issue only about one request per hour, the device may initially be allocated a sufficient amount of tokens for one or two requests, and the faucet will be configured to replenish one request's worth of tokens only once per hour. The rate of replenishment may alternatively be set according to the capacity of the proxy system 80 and/or distributed ledger system 90 to handle incoming requests and transactions.

If informational requests (not requiring execution of a transaction on the distributed ledger) are routed to the static copy repository 96 via the explorer 97, the proxy system 80 can also mitigate the risk of a denial of service attack by charging and refunding tokens for each request received from a device 10, 20, 21. For example, if an administrator device 20 requests a list of paired devices for a given client device 10, the proxy system 80 first queries the transmits a transaction to the distributed ledger system 90 to transfer a token amount from the administrator device account to the proxy system's account, and if successful, the required query via the explorer 97 is then carried out. After a predetermined time (which may be determined as described above), the proxy system 80 creates another transaction returning the token amount to the administrator device account.

Use of tokens in this manner also enables creation of a record of requests received from a given device. For example, a review of the transaction history will show the tokens spent by a client device or an administrator device on requests for encryption keys of other devices, which may be used to determine whether the requesting device may have been compromised (for example, if the total number of requests or number of failed requests exceeds a certain threshold). To reduce the number of transactions on the distributed ledger recording security-related or network administration-related information, the token transactions may be carried out on a separate distributed ledger. The separate ledger thus provides another source of data for performing audits of device activity. Of course, denial of service attacks may be mitigated using known techniques as well.

Figure 8:
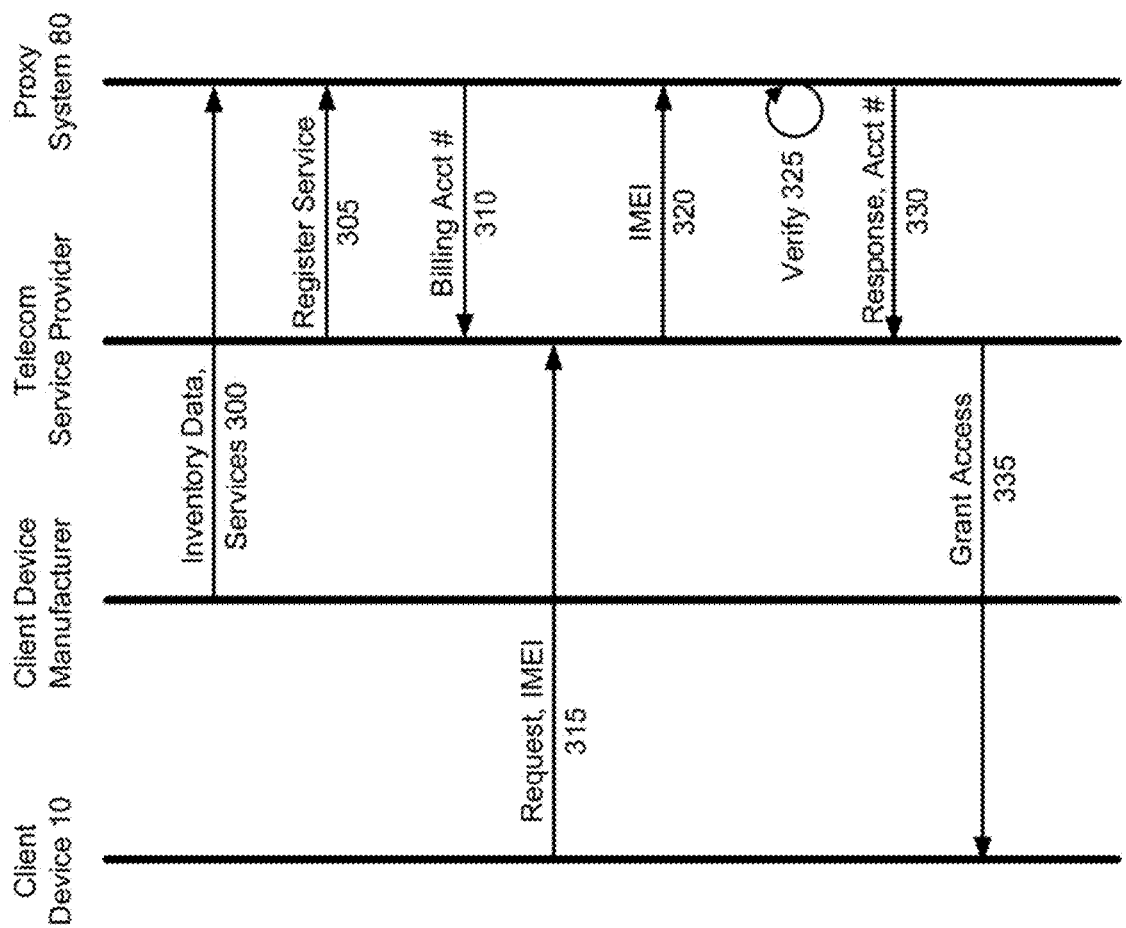
FIG. 8 is a sequence diagram illustrating a high level process for associating a telecommunications carrier or client device vendor with the distributed ledger system.

Initial registration of a client device 10 in the distributed ledger may depend on prior registration of the client device manufacturer, and possibly a telecommunications service provider (a "carrier"), with the proxy system 80. An example of a high level process for initial manufacturer and carrier registration, and service provisioning for the manufacturer's client devices, is depicted in FIG. 8. A manufacturer generates and transmits inventory information 300 to the proxy system 80, comprising the initial identifiers of the devices and an identification of services associated with the devices. If the administrative identifiers allocated to client devices are not the same as the initial identifiers, then the inventory information could include the administrative identifiers as well, to facilitate future operations by the proxy system 80.

In this context, "services" correlate to the vendible or operational data published by the device for delivery to the data storage and/or distribution system 60. For example, a simple humidity sensor may publish a single set of sensor data (humidity readings) a single set of operational data; it is therefore associated with two services. The definition of these services is used to define address or namespace information for storage or distribution of the data. The initial identifiers, as mentioned above, can be a manufacturer-assigned value or a standard identifier such as an IMEI. As the initial identifier is used for inventory purposes, it should uniquely identify the device in the inventory information. The proxy system 80 registers the services specified by the manufacturer, providing information to the data storage and/or distribution system 60, if necessary, to provision accounts or addresses for the client device data. The proxy system 80 also stores the list of initial identifiers.

If the client device requires carrier network access, terms of access would be negotiated between the manufacturer and the carrier for each of the services defined for the client device. The carrier then registers with the proxy system 305 in association with specified client device services. The proxy system 80 registers the carrier and may return a billing account number associated with each service 310.

Subsequently, a client device 10 that communicates over a wireless network, once activated by its owner, will request access to the carrier's network, providing its IMEI 315. The carrier sends the IMEI to the proxy system 80 to determine whether the IMEI is associated with a registered service. At 325, the proxy system 80 verifies the IMEI against its inventory information. If the IMEI is not found, the proxy system 80 sends a response 330 indicating that the IMEI was not failed. The carrier may then reject the client device's request for network access (not shown in FIG. 8). If, on the other hand, the IMEI is found, the proxy system 80 returns a message 330 indicating success, and including a billing account number for the associated services for that IMEI. The carrier may store the billing account number in association with the device IMEI for future billing purposes, and then grant network access 335 to the client device.

If the client device 10 does not require carrier network access, then steps 305-335 would not be necessary. For billing purposes, billing accounts associated with the services would be registered in the proxy system 80 for the manufacturer rather than the carrier.

Figure 9:
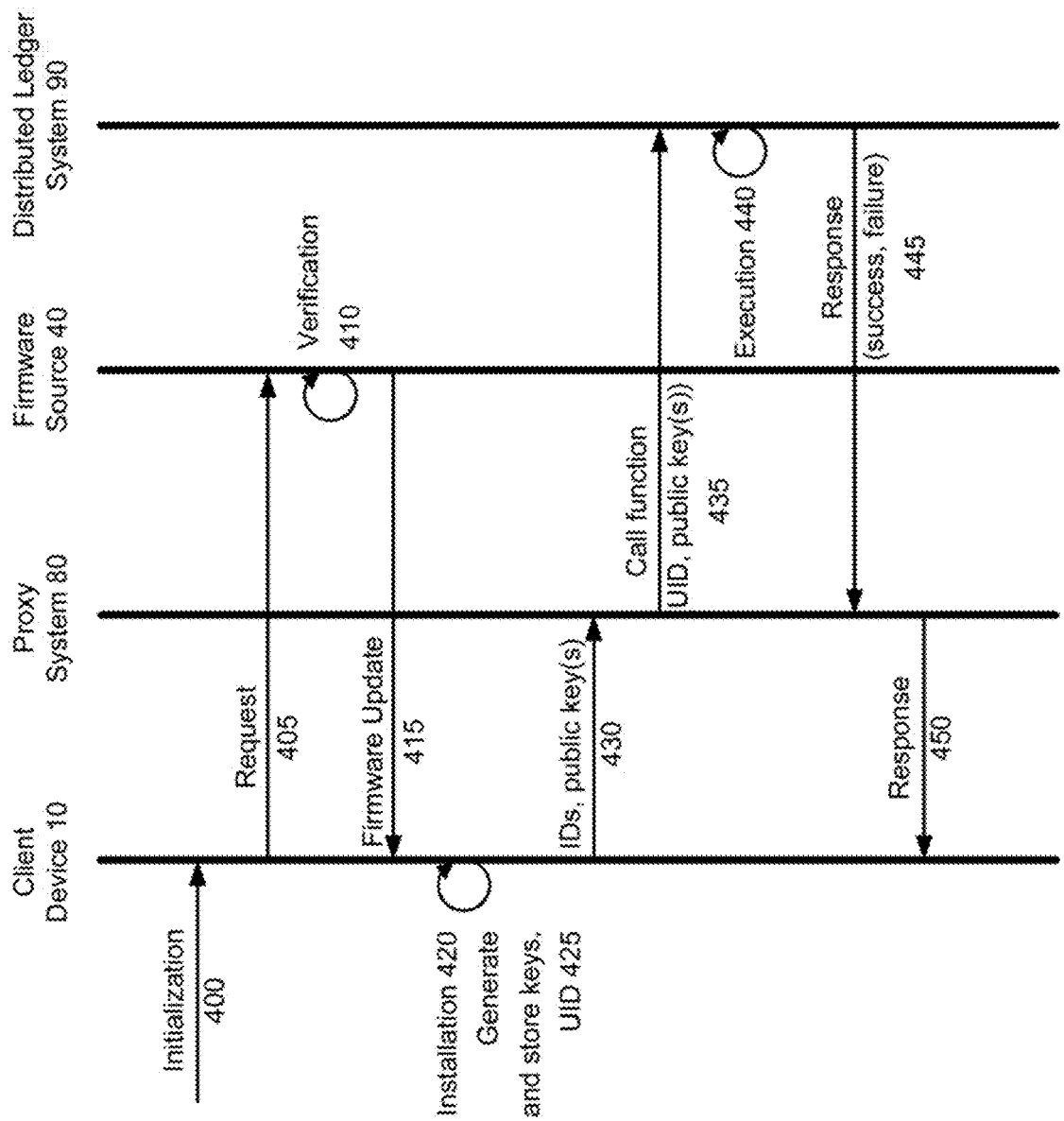
FIG. 9 is a sequence diagram illustrating a high level process for registering a new client device with the distributed ledger system.

Turning to FIG. 9, client device 10 onboarding typically occurs upon receipt by the operator of the client device (e.g. the consumer or purchaser of the client device 10, or the enterprise or other organization employing the client device 10). The client device 10 is first initialized 400, which may include diverse actions depending on the nature of the client device 10, such as physical installation steps. This may be required, for example, in the case of a smart lock, lighting, or other fixture. Other client devices, such as networking equipment, may require establishing wired connections with other devices in the operator's network.

During the initialization 400, the client device 10, on booting, checks for a network connection. If there is no network connection, initialization of the client device 10 may not proceed any further; if the device 10 includes a sufficiently robust user interface, it may present an error message or instruction to the user to physically connect the device to a network (e.g., using an Ethernet port) or to bring the device within the range of a suitable wireless network. Initialization may include, where necessary, input of credentials required to access the network. If the client device 10 is provided with a SIM card as mentioned above, credential input would not be necessary. If the client device 10 is being added to WLAN, on the other hand, the operator may be required to input the network key to enable client device access.

Also, on the initial booting, the client device 10 enters a firmware update mode and attempts to contact 405 the firmware source 40 over the network connection to obtain a current version of the firmware required for the client device 10. As mentioned above, the client device 10 is provided with an initial identifier stored in memory. This value is included in the request 405. It may be noted that the client device 10 may, on later occasions, contact the firmware source 40 to re-download the firmware or obtain updates; to do so, the requests sent may include not only the initial identifier, but also version and timestamp information indicating the currently installed version of firmware and the time of download or installation. The content and formatting of requests to the firmware source, such as request 405, may be determined by the skilled reader.

On receipt of the request 405, the firmware source 40 verifies the initial identifier 410. If the initial identifier is not verified, the firmware source 40 may return an error notification (not shown in FIG. 9). An error may result if the initial identifier is not present in the firmware source's list of identifiers assigned to devices, for example. If the initial identifier is verified, the client device 10 may be permitted to download a firmware update 415 from the firmware source 40, which is installed at step 420. The firmware update 415 may include various libraries, as may be required by the client device 10, as well as cryptographic libraries comprising algorithms for generating symmetric and/or asymmetric keys, and encrypting and decrypting data. The firmware may also include the installable client module, as well as required addresses or application programming interfaces (APIs) for communicating with the proxy system 80. However, the installable client module and the addresses/APIs may not be comprised in the firmware, but may instead be downloaded or otherwise received separately by the client device 10.

In some implementations, the firmware update 415 received by the client device 10 is timestamped with the date of transmission to the client device 10, and must be installed within a predetermined time after the timestamp to ensure that the firmware is valid. The firmware may be configured such that if the firmware is not installed within the predetermined time, any attempted installation of the firmware will fail. Generally, delivery of the firmware update 415 may follow the firmware source's best practices, which may include such time limitations, encryption policies, digital signature polices, etc.

At step 425, as part of the initial execution of the newly installed firmware, the client device 10 generates and stores at least one set of asymmetric encryption keys for use in encryption/decryption and signing operations. As it is generally preferable to employ distinct key pairs for encryption/decryption and signing, at least two asymmetric public-private key pairs may be generated at this stage and stored in the key store of the client device 10. Additionally, if the cryptographic algorithms include a hybrid algorithm, multiple asymmetric key pairs will be required for encryption/decryption. Thus, more than two key pairs may be generated at this stage. The keys are generated using at least some random or quasi-random value as input to the key generation function, using the output of a random number generator module on the client device 10 or near-random user or sensor input, if the client device 10 includes suitable input mechanism for receiving sufficiently random values.

Also at 425, the client device 10 generates a UID and stores the UID temporarily. The UID may be generated as a hash of the output of a random number generator or from random or quasi-random input from the user. In some implementations, the UID may be generated from a combination (e.g., a concatenation) of a random or quasi-random value and the initial identifier. While the use of a hashed value may not be strictly necessary, use of a hash algorithm (which may be defined in the firmware for devices of the class of client device 10) may ensure that resultant UIDs are of consistent length. The UID may alternatively be generated by hashing a private key as generated by the client device 10. As will be appreciated by those skilled in the art, the UID is used to collate data and messages across various nodes; accordingly, an appropriate UID distinguishes the client device 10 from other devices within the same system. In the illustrated examples, the UID distinguishes the client device from other devices in the distributed ledger. One technique for generating a sufficiently unique identifier that may serve as the UID is described in co-pending U.S. patent application Ser. No. 16/183,254 entitled "Blockchain Identification System", filed on Nov. 7, 2018, which is incorporated herein by reference.

Once the UID and the keys are generated, the client device 10 then contacts the proxy system 80 (e.g., using the provided API) and transmits the UID, initial identifier, and its public key(s) 430 to the proxy system 80. This may occur as part of a request for registration. The proxy system 80 conducts a verification to determine whether the client device 10 should be registered on the distributed ledger. In one implementation, the verification procedure comprises a check of the inventor information previously stored at the proxy system 80 to verify that the initial identifier is valid, and a request to the distributed ledger system 90 to verify the uniqueness of the UID as an identifier of a device in the distributed ledger. In some implementations, there may also be checks to determine that accounts have already been established for the services associated with the client device 10. In the example illustrated in FIG. 9, this is depicted as a function call, i.e., invocation of a function in a smart contract or chaincode stored in the distributed ledger. The proxy system 80 addresses a specific function for the vendor/carrier associated with the client device 10 (e.g., using an application binary interface or ABI, or other address, which was previously provided to the proxy system 80) on behalf of the client device 10 to add a new account to the distributed ledger. The call can include the UID and the public key(s) as parameters.

Execution of the function 440 by the distributed ledger can include a check of the distributed ledger to determine that the UID is acceptably valid, and a responsive action dependent on the outcome of the check. The check may simply involve a verification that the UID is unique in the distributed ledger to date.

In some implementations, the proxy system 80 may also verify that any required addresses or namespaces for publishing or storing data have also been established.

If the UID is not sufficiently unique, a failure message 445 may be returned to the proxy system 80. If the UID passes the check, the function executed by the distributed ledger system 90 additionally creates a new account for the UID in the distributed ledger, storing the client device's UID and associated public key(s). Other data may be stored in the distributed ledger for the client device 10, including pairing and permissions information, as well as the initial identifier. Optionally, as discussed above, other information may be stored in the distributed ledger for the client device 10 as well, such as device operational and state information, although as noted above this type of data may be stored elsewhere, e.g., in the data storage and/or distribution system 60.

Figure 10:
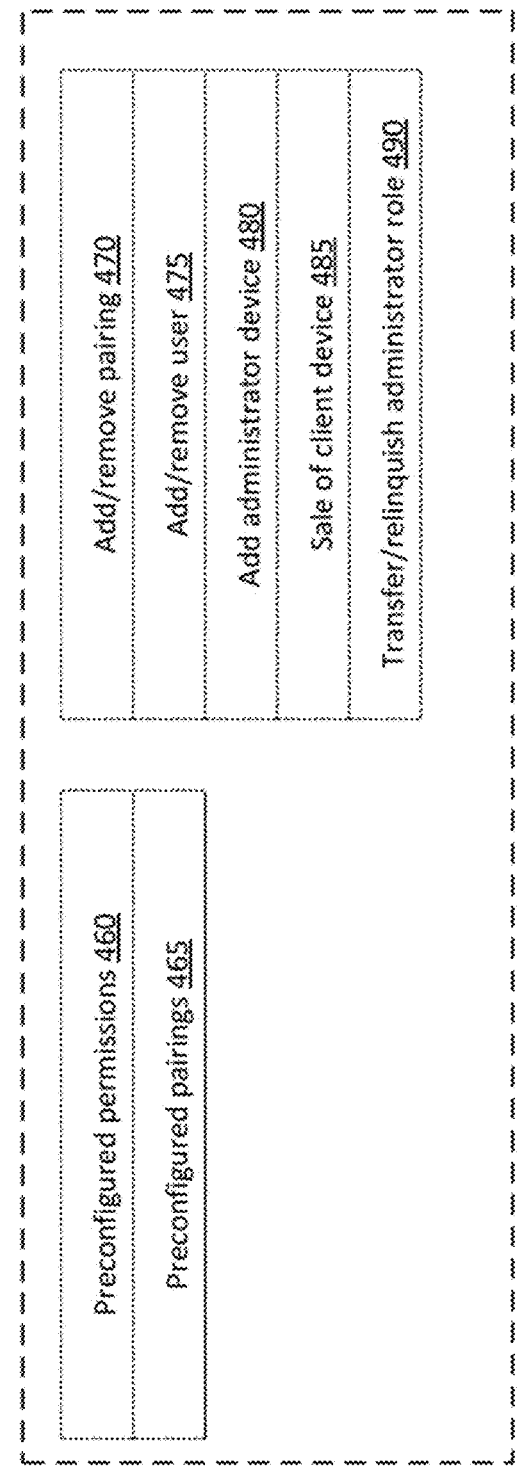
FIG. 10 is a block diagram illustrating a code template for use by the distributed ledger proxy system.

The proxy system 80 also updates the distributed ledger by adding new chaincode (e.g., a smart contract) associated with the UID. This chaincode comprises functions to be called when certain actions are required in the distributed ledger involving the client device 10. In one implementation, templates for the required functions are stored by the proxy system 80 (e.g., in data store 85), and are retrieved to generate code specific to a new UID. FIG. 10 is a schematic representation of code fragments or smart contracts that may be stored in the distributed ledger for the client device 10. The code fragments can include information that is used to define security relationships for the client device 10 when it is added to the distributed ledger, such as preconfigured permissions 460, such as those granted to an administrator device or to a user device, or preconfigured pairings 465 with other client devices, as identified by their UIDs. Preconfigured permissions and pairings may be defined by the device manufacturer and provided to the proxy system 85 in advance of deployment of the client device 10. For example, permissions or pairings may be used to permit the manufacturer's personnel to access the device 10 functions to provide customer service or repair work. Preconfigured data of this type may not be editable by the administrator of the client device. Other code fragments or smart contracts include actions that change the state of the distributed ledger by recording a new transaction implementing a change to the security information (e.g., permissions, pairings, keys) of the client device, such as adding or removing a pairing 470; adding or removing a user 475; adding an administrator device 480; transferring the client device by a sale 485; or transferring administrative control to a new administrator device, or having an administrator device relinquish its administrator role 490.

Alternatively or additionally, chaincode for configuring other functions or settings of the client device 10 may be added, in the same code described above in respect of security relationships, or in separate smart contracts added to the distributed ledger. These functions or settings can include, in the case of networking devices, network configuration information defining the network administration-related actions mentioned above, as well as gateway settings, firewall or routing rules, MAC filtering, port mapping, network topology (e.g., defining the logical location of the client device 10 in a network), access to storage and processing, link aggregation, multiplexing settings, and so on. These functions or settings can also include information on service level agreements that can include quality of experience, quality of service, minimum latency, minimum packet loss, and other network performance parameters. A smart contract can also define what information is to be monitored/ or collected by the client device 10 and how it is to be reported (e.g., via the data storage and/or distribution system 60). The smart contract can also define interfaces, data formats, and other parameters that are needed for interfacing with external devices (e.g., other devices on the same network as the client device 10).

Again, the smart contracts defining network configuration information for a client device may be preconfigured by the device manufacturer for inclusion in the distributed ledger. Smart contracts defining network configuration information may also be defined by another entity (e.g., an administrator of the client device, if the administrator has sufficient permission, or an organization deploying a set of client devices). While in the example implementation described here, the smart contracts defining configuration information are executed when the client device 10 is first deployed in a network and registered in the distributed ledger, in some embodiments an authorized party (e.g., the manufacturer, the entity deploying the client devices, or the administrator of the client device) may add a new smart contract to the distributed ledger at a later time to alter the previously set network configuration and/or security information, by re-defining a previously set configuration or adding new configuration information. The smart contract is then subsequently executed to deliver the updated information to reconfigure the client device 10. Additionally, smart contracts may be added to the distributed ledger at the instance of an administrator or user of the client device 10 to record changes to the network configuration or security information of the client device 10 (to the extent the administrator or user has permission to do so). The deployment of network configuration information using the distributed ledger may be used to facilitate the virtualization of network functions (e.g., employing Network Function Virtualization), since the network configuration deployed in this manner can be used to configure the functions of general purpose network hardware. Further, the distributed ledger system effectively permits entities managing the client devices (e.g., the manufacturer or entity deploying the client devices in an enterprise or other organization) to centrally manage and program multiple client devices in their network, consistent with the Software Defined Network (SDN) paradigm.

In this implementation, in FIG. 9 the generated code can thus be included in the function call 435 to the distributed ledger system 90, and execution 440 would include addition of the new chaincode to the distributed ledger. The code may alternatively be transmitted to the distributed ledger system 90 for addition to the distributed ledger in a separate request. However, in a further implementation, the above functions 470-490 and network configuration information-setting code are not added at the time the client device 10 itself is registered in the distributed ledger. Instead, they are added in a smart contract earlier in the distributed ledger, prior to registration of client devices. The smart contract in this case would be written generically, and would take the client device 10 as an input parameter. The smart contract could then be invoked on behalf of any client device 10. Any custom functions or preconfigured values required for a client device would be added at the time the device was onboarded.

Continuing with FIG. 9, on successful execution 440, a response 445 indicating success is sent to the proxy system 80. If the response indicates that the check was successful, the client device 10 may then permanently store the UID by recording the UID in the write-once memory. The response message 445 may include any necessary reference values to enable location of the information and code entered in the distributed ledger (e.g., a transaction number, block number, and/or ABIs for stored functions in the distributed ledger). The proxy system 80 may then transmit a response message 450 to the client device 10 based on the response 445. The reference values may be included in the response message 450, which the client device 10 can then store in non-volatile memory for use in generating further requests to the proxy system 80. However, this information may be stored by the proxy system 80 on behalf of the client device 10. The proxy system 80 also stores the network address of the client device 10 in association with the UID (and administrative identifier) for future communications.

If the response message 450 indicates that the check failed, this may have occurred for a variety of reasons (e.g., the initial identifier was not found, or the UID was not sufficiently unique). In the case where the UID was found to have already occurred in the distributed ledger, the client device 10 at this stage may generate a new UID (not shown) and attempt the process of 430-450 again until it is successful. The proxy system 80, since it mediates these communications, may track the number of attempts by the client device 10 to register on the distributed ledger, and may disallow further attempts after a predefined limit.

It will be appreciated by those skilled in the art that the execution of the function or smart contract 440 may take different forms. For example, the proxy system 80 may engage in a multi-step verification/account addition process, in which it first checks the distributed ledger (or the representation of the ledger in the explorer 96, as discussed above) to determine whether the UID is sufficiently unique, and if the UID is sufficiently unique, it secondly invokes a smart contract (i.e., calls a function) to create a new account in the distributed ledger for the UID. Furthermore, a query that does not require a change of state in the distributed ledger may be carried out by calling a function in the static copy of the distributed ledger. In the interest of clarity, FIG. 9 and the remaining drawings depict interactions between the proxy system 80 and the distributed ledger system 90 only as depicted in FIGS. 4 and 5, without the data storage system 95, static copy repository 96, or explorer 97. However, it should be understood that the processes depicted in FIGS. 9-16 also apply to the systems illustrated in FIGS. 6 and 7 as well. Those skilled in the art will understand how modifications may be made to the interactions depicted in the accompanying figures to accommodate an explorer 96. In addition, it should be understood that the token metering procedure described above to mitigate denial of service attacks may also be integrated into these processes. They are not illustrated here for the sake of simplicity.

On completion of the process illustrated by FIG. 9, the client device 10 is thus registered on the distributed ledger; however, no permissions, pairing information, configuration or other control information may have been added to the distributed ledger for the client device 10 unless they were included by the proxy service 80 in a request to the distributed ledger system 90 as part of the onboarding procedure. For example, as part of execution 440, any smart contracts defining configuration information for the client device 10 such as permissions, pairings, and/or configuration of other functions or settings may be executed as well, generating configuration instructions that are also transmitted via the proxy system 80 to the client device 10 as part of responses 445, 450. Alternatively, smart contracts defining configuration information may be executed separately and return configuration information to the client device 10 separately, e.g. in control messages, in response to a further request initiated by the client device 10 after its initial registration (not shown in FIG. 9), or in response to invocation by other code executed by the distributed ledger system 90 during execution 440.

The client device 10 would then self-configure itself based on the received configuration information. In this way, client devices can be manufactured and distributed in an initial unconfigured state, deployed in a network, and then automatically configured according to predefined configuration information stored in the distributed ledger. As noted above, smart contracts defining configuration information may be provided by the device manufacturer to the distributed ledger system 90; however, the smart contracts may instead be provided by or on behalf of the entity that is deploying the devices (e.g., a carrier, or an enterprise deploying network equipment). Thus, an enterprise or other organization may use the distributed ledger system 90 to configure networking equipment or other client devices. Smart contracts provisioned in the distributed ledger in this manner may define different settings for different sets of client devices 10. Configuration settings for sets of client devices 10 may thereafter be altered by adding and executing a further smart contract, for example as described above; and if a client device 10 is reset, the configuration information can be re-obtained from the distributed ledger system 90. It should also be noted that when the UID is immutable, the user may not be able to override settings imposed by the manufacturer via the distributed ledger. Even if the client device 10 is removed from its initial network, has its configuration wiped, and is deployed in another network, the smart contract(s) comprising the client device configuration settings may not alterable by the user.

Figure 11:
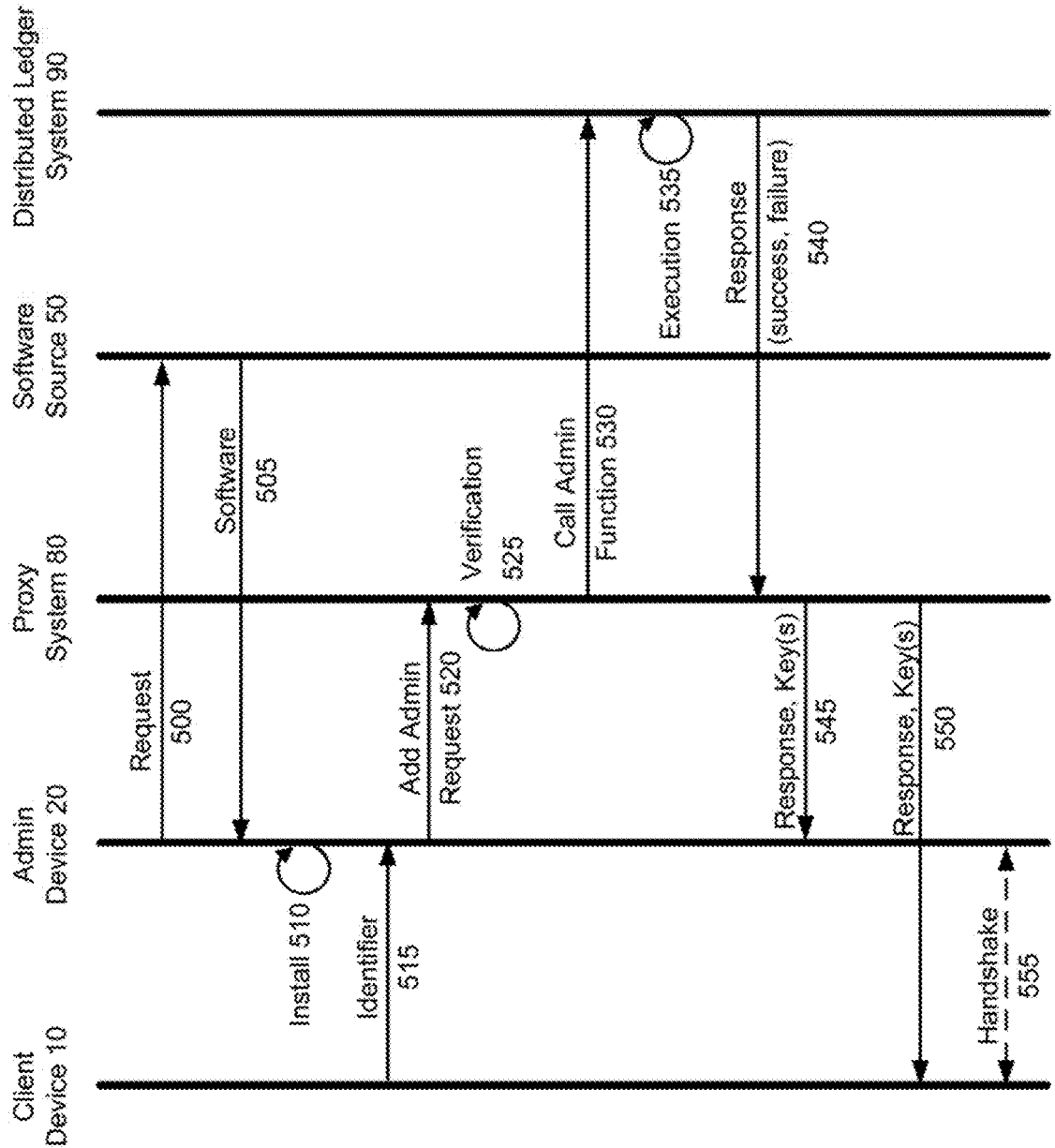
FIG. 11 is a sequence diagram illustrating a high level process for creating an administration relationship between a user device and a client device.

FIG. 11 depicts a high-level process for adding an administrator device for an onboarded client device 10 subsequent to the initial registration and configuration process of FIG. 9. As discussed above, the proposed administrator device 20 may be a typical personal user communication or data processing device. The proposed administrator device 20 obtains a device control application for use in operating or managing functions on the client device 10. While the proposed administrator device 20 may have been provisioned with this device control application at an earlier stage, it is expected that in the context of consumer client devices, the application will only be obtained and installed once the client device 10 has been onboarded. This can be done in a conventional manner by a direct download from a vendor/carrier associated with the client device 10, from a server associated with the operator of the proxy service, or from a third party such as an online software marketplace ("app store"). As noted above, the source of the device control application is represented generically in FIG. 1 as the software source 50. FIG. 11 represents a typical download and installation process with request 500 to the software source 50; a responsive transmission 505 from the source 50 (i.e., software download), and installation 510 in FIG. 11, likely over a network connection from an external server over a public network (e.g., the Internet). Subsequent steps executed using the administrator device 20 may be carried out through execution of the installed device control application, which would be provisioned with appropriate addresses or APIs to request the appropriate services from the proxy system 80.

The proposed administrator device 20 need not have been onboarded in the same manner as the client device 10; accordingly, on initial execution of the device control application or as part of the installation process 510, the proposed administrator device generates its own UID. This may be done using a similar methodology as for the client device 10, although the UID may not be stored in non-erasable memory. The proposed administrator device 20 also obtains any required cryptographic libraries, if not already provided on the device 20, and generates any asymmetric key pairs required for communication (i.e., signing and encryption) if not already generated on the device. Depending on the particular implementation and the configuration of the device, this may require a separate firmware update by the device 20 to obtain the required libraries. It is presumed, for the purpose of this example, that the proposed administrator device 20 processing system includes a secure or trusted memory and execution zone which is used for generating and storing cryptographic keys, and other sensitive information. The UID may be stored in this zone as well.

The proposed administrator device 20 obtains an administrative identifier 515 from the client device 20. As discussed above depending on the nature of the client device 10, the identifier obtained at this step may comprise a machine or human-readable insignia provided on an exterior of the client device 10, such as a barcode or serial number, which can be scanned and recognized by optical recognition software executing on the proposed administrator device 20 or that can be manually entered by the user into administrator device 20. If the client device 10 has a capable user interface, insignia may be displayed on a display screen or audibly transmitted for capture by the proposed administrator device 20. As another example, if both devices 10, 20 are suitably equipped, the identifier may be transmitted wirelessly, for example using near-field communication (NFC). The administrative identifier value provided at 515 may have the same value as the initial identifier transmitted to the proxy system 80 during device onboarding, as described with reference to FIG. 9. However, if the client device 10 has a sufficiently capable user interface (e.g., display screen or audible interface) or is able to communicate with the proposed administrator device 20, the client device's UID may be directly provided instead at 515.

Once the identifier has been received, the proposed administrator device 20 transmits a request 520 to the proxy system 80 to be added as an administrator of the client device 10. The request 520 may include the administrator identifier or UID of the client device 10, the UID of the administrator device 20, and the administrator device's public key(s). If the request 520 included an identifier other than the UID of the client device 10, then the proxy system 80 may carry out an initial verification 525 that the identifier is associated with a device UID. If the proxy system 80 has its own records of corresponding identifiers and UIDs, this verification 525 may comprise querying its own data store to locate the corresponding UID. Alternatively, this may involve a request to the distributed ledger system 90 or the proxy system's own data store 85 to determine the associated UID for the identifier. This may be bundled with other requests sent to the distributed ledger system 90 as part of the administrator designation function.

The administrator device 20 may also register a user (e.g., owner/operator of the administrator device 20) identity with the proxy system 80. This registration may follow a conventional method for registering a licensed user of a software product; for example, the user may submit personally identifying information such as name, address, email address, consent to specified terms and conditions, and so forth. This information may be stored by the proxy system 80 in its own data store 85, and/or may be stored by the distributed ledger system 90 either in the distributed ledger itself, or in external storage 95. The administrator device 20 UID, user identity, and network address may be stored in association by the proxy system 80. The identifying information may then be used by the user to recover an account (for example, if a password for accessing the application on the administrator device 20 is forgotten) in the manner of conventional account recovery. The administrator device 20 UID, user identity, and network address may be stored in association by the proxy system 80.

If the client device UID is already available to the proxy system 80, then the proxy system 80 requests (i.e., calls chaincode function(s) or smart contract function(s) of the client device 10, via the appropriate ABI(s)) addition 530 of an administrator for the client device 10. The parameters sent to the distributed ledger system 90 as part of the request may include the UIDs of the proposed administrator device 20 and the client device 10, the device 20's public key(s), and, if required, information regarding permissions granted to the administrator. Generally, it is presumed that administrator-level permissions are the highest-level permissions available to a user, including the ability to manage other users of the client device 10, alter network configuration information for their associated client devices, add and remove device pairings, and invoke agile cryptography, transfer, and warranty actions as described below. The distributed ledger system 90 executes the function(s) 535, which can include steps of verifying the uniqueness of the UID for the administrator device 20 in the distributed ledger, and on successful verification, storing in the distributed ledger the public key(s) of the administrator device 20 in association with the administrator device UID; retrieving current information for the client device UID to verify that no administrator relationship currently exists for the client device 10; on verifying there is no existing administrator relationship, storing in the distributed ledger a client device-administrator device association; and retrieving the public key(s) of the client device 10. As mentioned above, key and administrator relationship data may be stored as a time-stamped entry in the distributed ledger, or in external storage 95 accessible to the distributed ledger. If the request 530 includes an identifier for the client device 10 other than the UID, the functions may include looking up the identifier in a data store available to the distributed ledger (or in the distributed ledger itself) to determine the corresponding UID so that other functions can be carried out. Optionally, chaincode for executing functions associated with the administrator device 20 may be stored in the distributed ledger as well, generally as described above with respect to the client device 10.

On completion, a success response 540 is transmitted to the proxy system 80. The response can include reference values such as the transaction and block identifiers and ABIs resulting from the execution, and the public key(s) associated with the client device 10. Responses 545, 550 are then transmitted to the administrator device 20 and client device 10 confirming the administrator relationship that was recorded in the distributed ledger. The responses can be combined with key distribution by the proxy service 80; the proxy service 80 transmits the public key(s) of the administrator device 20 (to the client device 10 and the public key(s) of the client device 10 to the administrator device 20, for storage in their respective key stores. The devices 10, 20 may then proceed with any required handshake protocol 555 to initiate communications between them, and use any appropriate encryption protocol for peer to peer messages. Again, as noted above, these example processes are based on the architecture depicted in FIGS. 4 and 5, but those skilled in the art will understand that suitable modifications may be made to these processes to accommodate the use of external data storage 95, a static copy repository 96, and an explorer module 97. These modifications may include modifications to the order and content of control messages exchanged between the client and administrator devices 10, 20 on the one hand, and the proxy system 80 on the other. For example, if the addition of the pairing relationship to the distributed ledger succeeds, an initial response from the proxy system 80 to the devices 10, 20 may simply be a confirmation. Subsequently, the proxy system 80 may query the static copy to obtain the public keys for each of the devices 10, 20, and then transmit the keys to the other device 20, 10 in a separate control message.

The execution 530 may fail, in which case the response 535 indicates a failure, and no keys are distributed. For example, a correlation between the non-UID identifier for the client device 10 and a UID may not be found in the distributed ledger; or it may be determined that an administrator relationship has already been defined and stored in the distributed ledger for the client device 10. A possible handling of the latter error is discussed below in the context of the addition of secondary users.

The administrator device 20 may be designated an administrator of multiple client devices 10, but as seen above, a given client device 10 has only a single administrator device 20. In one implementation, when the administrator device 20 administers a plurality of client devices, the UID is generated only once for the administrator device 20 and is used for any associations created between the administrator device 20 and any client device. This may be appropriate in the case where a single application executing on the administrator device 20 is used to administer and/or operate any client devices (for example, if the same application is used to control smart light fixtures and a thermostat). A single UID for the administrator device 20 may also be used for different applications controlling different types of client devices 10. However, in that case, the UID must be shared among the applications, for example by defining a specific memory location for storing the UID that is accessible by all applications, or by requiring the user to input the UID generated by a first application each time another application for controlling another device is installed.

Alternatively, each application installed on the administrator device 20 for controlling a type of client device may generate its own UID; in other words, the user may be required to register multiple accounts with the proxy system 80 via each individual application. This may be a preferred implementation in some cases, because different client devices may have different security policies. For example, the security policy for a smart light fixture may be weaker than the security policy for a smart door lock; the weaker security policy may specify shorter encryption keys, weaker passwords for accessing administrative functions, etc. Both policies would be implemented by the same administrator device 20 controlling both the smart door lock and the smart light fixture, and it may be desirable to ensure that there are distinct UIDs associated with the stronger and weaker keys, so that if the smart light fixture is compromised, there is less risk of an attack on the door lock, because the UID information for the light fixture will not be valid for the door lock. Optionally, the distributed ledger system 90 may maintain a distributed ledger associating UIDs that belong to the same registrant.

The same considerations and variations for the use of a single UID or multiple UIDs also apply to the addition of a secondary user device 21, which is a device with at least sufficient permission to operate a client device 10, but less than all the permissions available to the administrator device 20.

Figure 12:
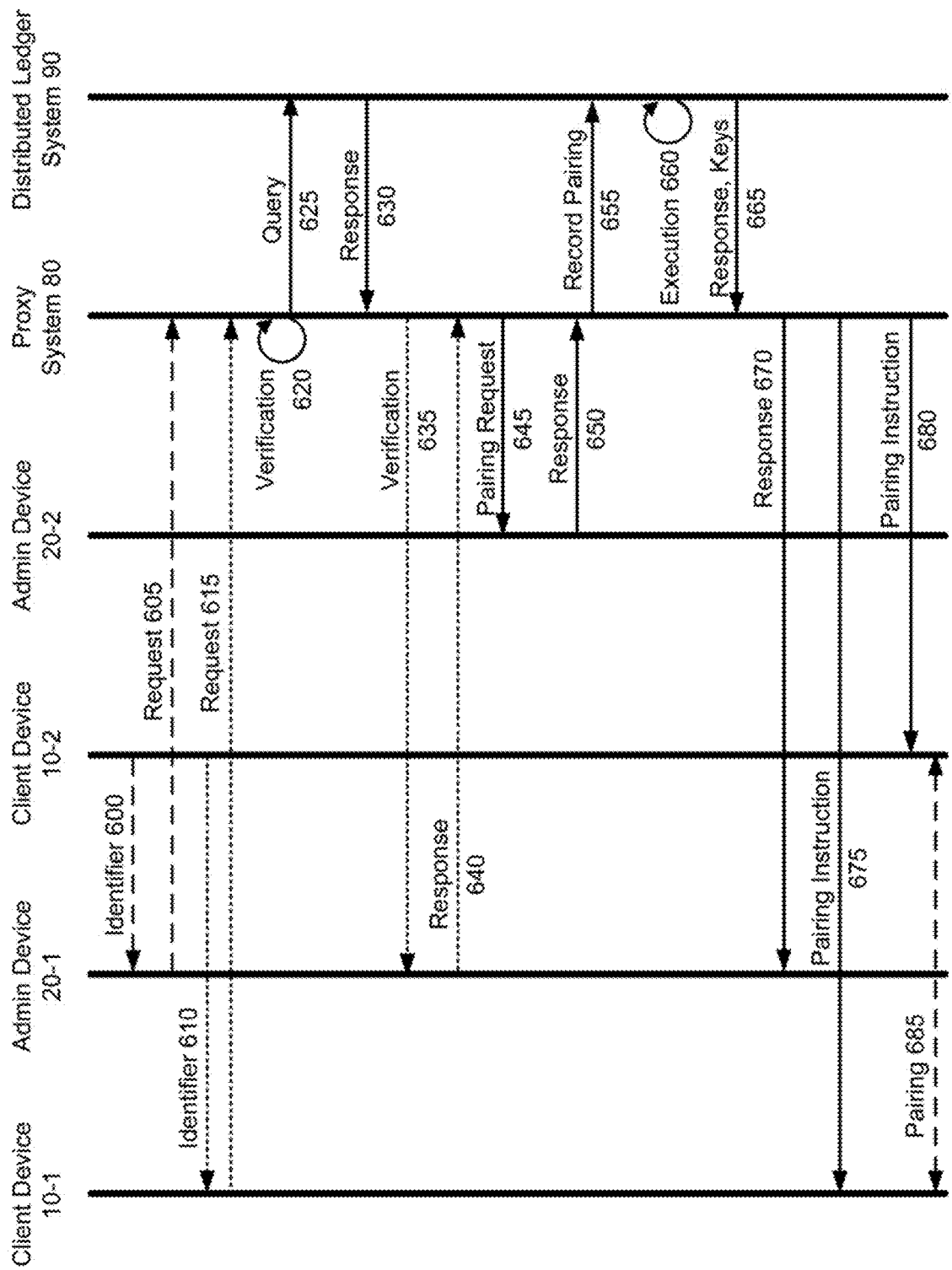
FIG. 12 is a sequence diagram illustrating a high level process for pairing two client devices.

FIG. 12 depicts a high-level process for pairing two client devices 10 for P2P messaging, designated in FIG. 12 as 10-1 and 10-2. Pairing in this scenario requires the permission of a client device's respective administrator device and the recording of the pairing in the distributed ledger. Each client device 10-1, 10-2 has a respective administrator device 20-1, 20-2. The request for pairing may originate at a first client device, or with a user or an administrator device. In FIG. 12, examples of a request for pairing with a target client device 10-2 initiated by the administrator device 20-1 of the subject client device 10-1 and a request for pairing initiated by the subject client device 10-1 are shown. The requesting device first obtains the administrative identifier for the target client device 10-2. If the requesting device is the administrator device 20-1, this process (600 in FIG. 12) can occur as described above with reference to FIG. 11. The same process can also be used where the requesting device is a user device 21, not shown in FIG. 12. In the case of the client device 10-1 initiating the request, depending on the interface capabilities of the device 10-1, the administrative identifier may be obtained the same way (610 in FIG. 12). Alternatively, if the client device 10-2 is capable of transmitting its UID to the requesting device, the UID may be provided at 600 or 610 instead.

Once the target client device's identifier is obtained, a request to add a pairing record is transmitted by the requesting device 20-1, 10-1 to the proxy system 80. The request 605 or 615 includes the UID of the requesting device; the UID of client device 10-1 (if it was not the requesting device); and the identifier of the target client device 10-2. If the request 605, 615 included an identifier other than the UID of the target client device 10-2, then the proxy system 80 may carry out an initial verification 620 to confirm that the identifier is associated with a device UID, and to obtain that target client device UID and the UID of the target administrator device 20-2, and optionally to also verify whether a pairing for client devices 10-1 and 10-2 was already recorded in the distributed ledger. The initial verification 620 can also include verification that the requesting device has authority over the subject client device 10-1; for example, to verify that the UID of the requesting device is the assigned administrator device 20-1. If the proxy system 80 has its own records of corresponding identifiers and UIDs and/or associated client devices, administrators, and users, the verification step 620 may consist of querying the proxy system 80's own data store. If the identifier obtained for the target client device 10-2 is the initial identifier, this may involve a request to the distributed ledger system 90 or the proxy system's own data store 85 to determine the associated UID for the identifier. As mentioned above, these verification queries may be bundled with other requests sent to the distributed ledger system 90. It should also be noted that in all these examples, verification steps—which do not change the state of the distributed ledger—may be executed by querying the static copy repository 96 storing the copy of the distributed ledger and the copy of externally stored data for the ledger, if the static copy repository 96 is employed.

If the UID of the requesting device is determined to be a UID for a device other than the administrator device 20-1—for example, a user device 21 (not shown), the subject client device 10-1—then a set of additional verification steps occurs to confirm that the administrator device 20-1 authorizes the request for pairing. This is shown as a verification request 635 and response message 640 between the proxy system 80 and the administrator device 20-1. If the administrator device 20-1 rejects the pairing request, then the process may terminate at that point, optionally with a failure message sent to the requesting device (not shown). When any request fails, the proxy system 80 may record the failed attempt in the distributed ledger or in another data store. As described earlier, a token/cryptocurrency-based metering system for mitigating denial of service attacks can provide a record of failed requests, which can be used to detect whether a device is potentially compromised.

Assuming these initial checks are successful, the proxy system 80 then contacts the administrator device 20-2 for confirmation that the pairing should proceed 645. Such requests for confirmation may be presented on an administrator device in a user interface of the device control application executing on the administrator device. A response 650 is received by the proxy system 80 accepting or rejecting the pairing; if the pairing request is rejected, again the process may end with a failure message sent to the requesting device. Of course, if the requesting administrator device 20-1 is also the administrator device of the target client device 20-2, then this additional request/response is not necessary.

If the pairing request (if necessary) is accepted by the administrator device 20-2, then the proxy system 80 generates and transmits a transaction to record the pairing 655 in the distributed ledger. The distributed ledger system 90 executes the transaction and any required function(s) 660, storing the pairing association with reference to the client device 10-1, and optionally as well with reference to the client device 10-2. This updated information is stored by the distributed ledger system 90. A response indicating success of the transaction, together with public keys 665, is then sent to the proxy system 80 at 665 (as noted earlier, if a static copy is employed, the communication at 665 will be between the static copy repository and the proxy system). Optionally, a responsive message indicating success is sent to the requesting device (e.g., the administrator device 20-1, as shown in message 670). Further messages 675, 680 can then be sent to the client devices 10-1, 10-2, instructing them that they may pair with each other. This instruction may in fact comprise the public key(s) of the other device, retrieved by the proxy system 80, that are required to initiate a pairing. The client devices 10-1, 10-2 may then engage in a pairing procedure 685.

It will be appreciated that in some implementations, one or both client devices 10-1, 10-2 may not receive its pairing instruction message 675, 680 at the time it is transmitted; or, alternatively, a pairing may have been pre-defined for the client devices 10-1 or 10-2, as mentioned above with reference to FIG. 10. For example, the client device 10-1 may be a component comprising a distributed ledger service client in an automobile, and the client device 10-2 may control an access system in a parking garage. The owner of the automobile may have entered into a lease agreement with the operator of the parking garage, granting access to any parking garage controlled by the operator. As part of this agreement, the parking garage operator, via the proxy system 80, may have executed for it a smart contract defining pairings between the automobile client device 10-1, and all client devices 10-2 of the garage operator. In either case, when the client device 10-1 first attempts to pair with the client device 10-2 and transmits a request to the proxy system 80, one of the checks that may be executed by the proxy system 80 is to determine whether a pairing already exists, as mentioned above with reference to verification 620. If the pairing is found to exist in the distributed ledger, then the proxy system 80 proceeds to retrieve the required keys for each client device, and transmits them as in messages 675, 680.

Figure 13:
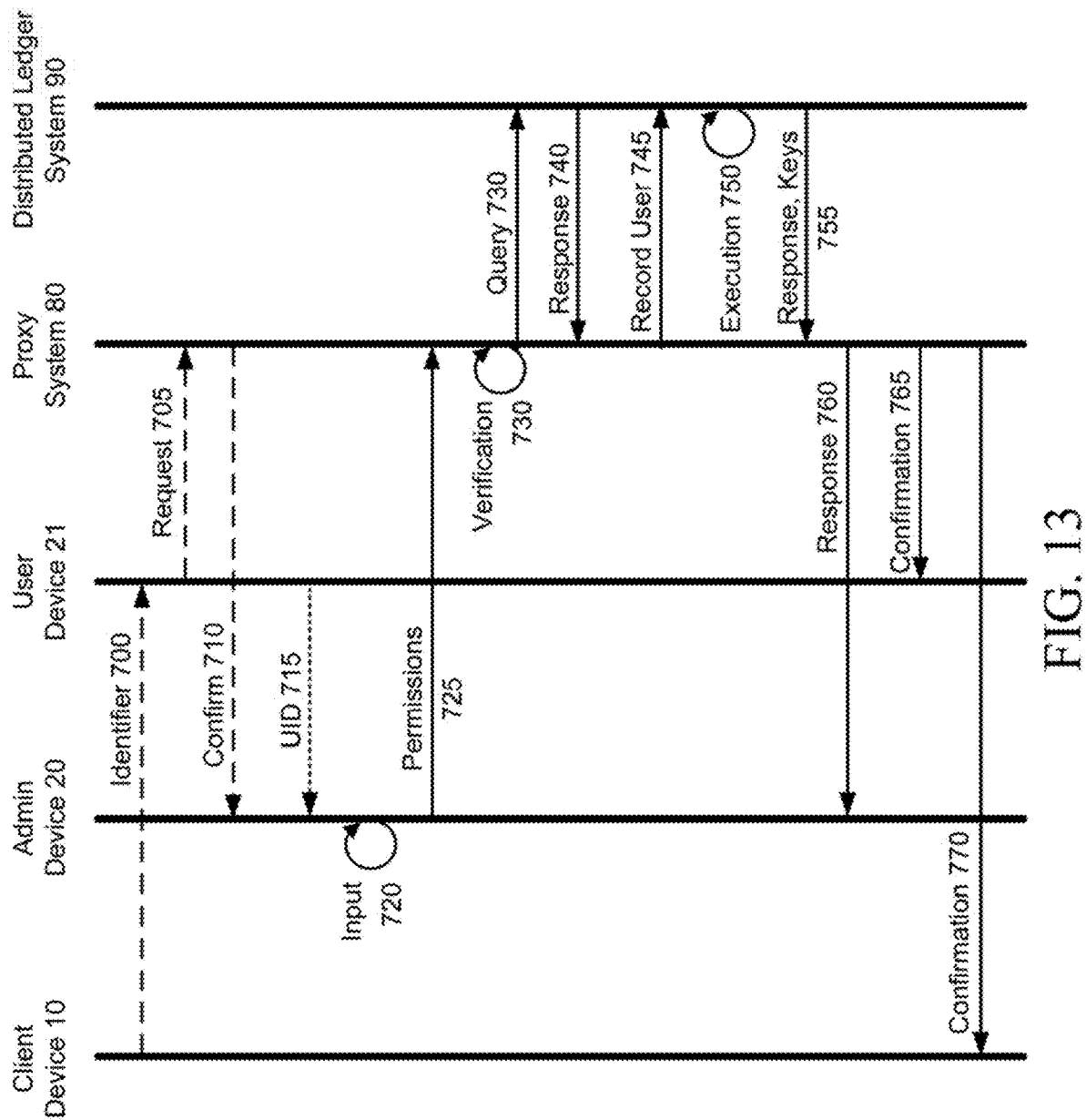
FIG. 13 is a sequence diagram illustrating a high level process for associating a second user device with a client device.

FIG. 13 depicts a high-level process for adding a user device 21 that has limited authority over a client device 10. As mentioned above, it is contemplated that the user device 21 may be a personal computing/communication device, similar to the administrator device 20. The user device 21 will download and install a device control application (which may be the same device control application installed on the administrator device 20), and generate a UID, in a manner similar to the administrator device 20 as discussed with reference to FIG. 11. Once completed, the user device 21 may either initiate a request to be added as a user for a given client device, or the administrator device 20 may initiate the request. In the former scenario, the user device 21 may acquire an identifier 700 for the client device 10 it wishes to control, then transmit a request 705 to be added as a user to the proxy system 80. Obtaining the identifier (which may be the administrative identifier, or the UID) can be carried out as described above. On receipt of the request, the proxy system obtains the UID of the associated administrator device 20 (this may involve a query of the distributed ledger, not shown in FIG. 13) and transmits a request for confirmation 710 to the administrator device UID. Alternatively, the addition of a user device 21 may be initiated by the administrator device 20. In one implementation, the administrator device 20 obtains the UID 715 of the proposed user device 21. This may be obtained using methods described above: for example, a user may manually input the UID of the user device 21 into the appropriate input field of the device control application; the administrator device 20 may be configured to receive the UID using NFC or by other wireless means, or by scanning a two-dimensional barcode displayed on a screen of the user device 21, or even by receiving a message (e.g., a short message service (SMS) message).

In either implementation, either as part of the administrator device 20's self-initiated request or in response to the confirmation request 710 from the proxy system 80, the user of the administrator device 20 confirms the user device 21's role as a use of the client device 10. This can include selecting a permission level, or individual permissions, to be granted to the user device 21 for all or a subset of client devices administered by the administrator device 20. For example, in the context of a smart door lock, the property owner (who owns the administrator device 20) may wish to give sufficient permission to a guest (and their user device 21) to be able to lock and unlock the door, but does not wish to give the guest sufficient authority to change the encryption algorithms or cycle the encryption keys employed by the door lock. In some implementations, permissions may be configurable with a time limit or defined period; for example, the guest may only have lock/unlock permission during a specific time of day, or only for the week that they are staying at the property. If the administrator device 20 administers a plurality of client devices 10, permissions may be granted for all devices, or only a subset. Some permission sets may be preconfigured in the device control application and available for selection by the user of the administrator device 20.

The permissions selected at the administrator device 20 are transmitted 725 to the proxy system 80, together with the relevant UIDs of the user device 21 and client devices 10. In the event the request for confirmation 710 was sent to the administrator device 20, the inclusion of permissions for the user device 21 in the transmission 725 is indicative of positive confirmation. As an aside, it will be appreciated that similar functionality in the device control application executing on the administrator device 20 may be employed to add or remove permissions granted to the user device 21, or to remove all permissions from the user device 21 altogether (i.e., remove the user device 21 as a user for one or more client devices administered by the administrator device 20). Thus, a request to change permissions may be initiated by the administrator device 20 with the input 720 and permissions message 725.

At 730, the proxy system 80 conducts any verifications, as appropriate. These verifications may be similar to the verifications described above for other processes, such as verifying the UIDs received from the administrator device 20, and that the administrator device 20 has authority over the specified client devices 10. As above, this may include queries 730 of the distributed ledger system 90 (or the static copy), and responsive messages 740. If these verifications are successful, the proxy system 80 then transmits a new transaction 745 to record and/or edit permissions granted to the user. The distributed ledger executes the transaction 750, updating the distributed ledger to include the association of the affected client devices 10 with the user device 21, and the permissions allocated to the user device 21. A response indicating success of the transaction, together with public keys 755 for the client device 10 and the user device 21, is then sent to the proxy system 80 at 755 (as noted earlier, if a static copy is employed, the communication at 755 will be between the static copy repository and the proxy system). Optionally, a responsive message 760 indicating success is sent to the administrator device 20. Further messages 765, 770 may then be sent to the client devices 10 gaining a user device 21, and to the user device 21, advising them of the relationship and providing the required keys so that the devices 21 can establish P2P communication, if necessary for controlling the client devices 10. In the event that permissions for a given user device 21 were altered or removed, of course no keys would be provided to the user device 21; but the client device 10 may be instructed in the confirmation message 770 to delete the keys associated with the user device 21 from its key store.

It may be recalled that messages controlling the operation of a client device 10 may be routed via the application server 50, rather than sent via P2P communication. In that case, it may still be necessary for the client device 10 to obtain a copy of the user device 21's (or administrator device 20's) key, since for verification purposes commands that are passed to the client device 10 may be signed using the user or administrator device's private key.

As alluded to above, security-related audits of client devices 10 may be performed from time to time. Audits may include a review of information about the pairings, permissions, etc. that are stored in the distributed ledger (or reflected in the static copy of the distributed ledger) to confirm that any UIDs of other client devices 10, the administrator device 20, and user devise 21 associated with a given client device 10 (e.g., through a pairing, designation of a user with permissions) are valid; a review of a client device's key store to ensure that the public keys stored in the key store are all associated with a paired device, administrator device, or user device recorded in the distributed ledger; a review the pattern of token "expenses" to detect an anomalous pattern; verification of the signature or hash of the client device's firmware; and so forth. The proxy system 80 may be configured to automatically initiate one or more of these auditing actions on a periodic basis for a given client device 10, or to automatically initiate an auditing action on discovery of a triggering event. For example, as mentioned above a repeated attempt by a client device 10 to make requests for which it has insufficient token value may be an indication that the device 10 is potentially compromised; the detection of the repeated attempt may constitute an audit-triggering event. A triggering event need not be detection of a possible attack. For instance, each time the administrator device 20 of a client device 10 is changed, an audit is automatically triggered. Audits may also be triggered manually (e.g., by the administrator device 20, or by an operator of the proxy system 80).

Figure 14:
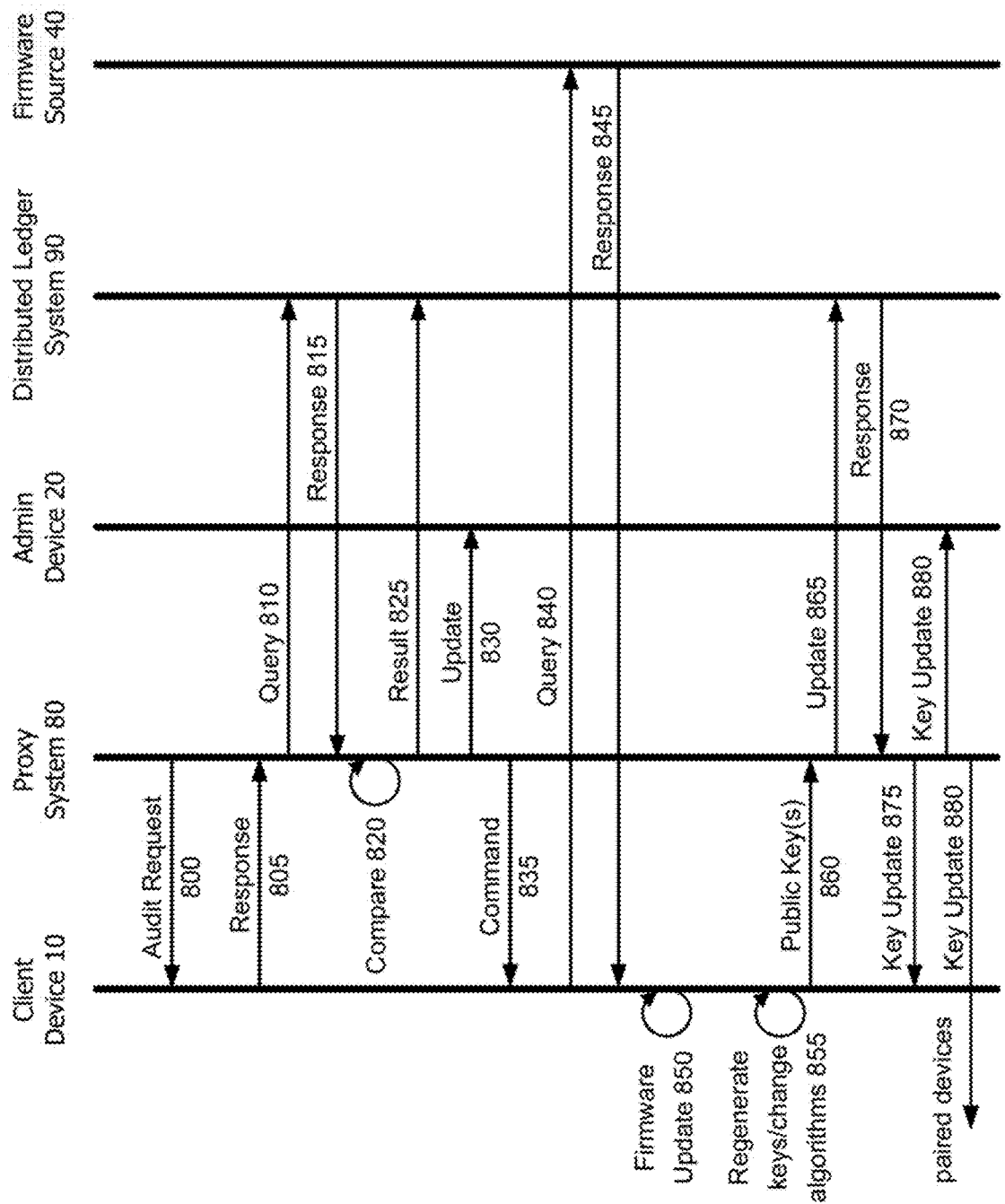
FIG. 14 is a sequence diagram illustrating high level processes for conducting an audit and for invoking agile cryptography action on a client device.

FIG. 14 depicts a simple example of one audit activity, verifying the key store of a client device 10. However the audit is triggered, the proxy system 80 sends an audit-related request 800 to the client device 10. The request, in this example, is a request for a listing of some or all of the public keys stored in the client device's key store (e.g., a list of UIDs stored in association with the public keys, or a list of UIDs and the corresponding key values). This listing is provided in response 805.

The proxy system 80 also queries the distributed ledger for a listing of all UIDs associated with the UID of the client device 10. This request 810 can also include a request for all the public keys for those associated UIDs, which are returned in the response 815. As noted above, the query by the proxy system 80 may be made of the static copy of the distributed ledger, if one is maintained. At 820, the proxy system 80 compares the results from the distributed ledger and the client device 10. If the listing from the client device 10 matches the information from the distributed ledger, this positive result may be recorded in the distributed ledger (result 825), if records of audits are maintained in the distributed ledger. Information about the results of the audit may optionally be transmitted 830 to the administrator device 20 associated with the client device 10.

If, on the other hand, the result of the comparison at 820 indicates a mismatch, this may be an indication that the client device 10 has been compromised, and that an unknown device has established communications with the client device 10. The proxy system 80 may then trigger a remedial or a crypto-agility action in the client device 10 (command 835), such as wiping the key store and re-provisioning the client device with paired/administrator device/user device keys based on the information in the distributed ledger; regenerating the client device's public/private key pair(s); and/or changing cryptographic algorithms. The remedial or crypto-agility action need not be triggered by a failed audit or other event; it may be manually invoked by the operator of the proxy system 80 or the administrator device 20. In the example of FIG. 14, it is presumed that a remedial or crypto-agility action is triggered by the proxy system 80 with the command 835.

As a first step—particularly if a new encryption algorithm is to be substituted for an algorithm currently in use by the client device 10—the client device 10 performs a check of its firmware version (assuming that the encryption algorithms used by the device 10 are included in its firmware) to determine that it has a current version. Thus, the client device 10 may query the firmware source 40 for current version information and compare the response with its own version information (not shown in FIG. 14). If the firmware version on the client device 10 matches the firmware version from the source 40, the firmware is up to date. Otherwise, the client device 10 may request 840 and download 845 an update for its firmware, which is installed at 850.

With current firmware, the client device 10 then regenerates its encryption keys (optionally wiping its key store of public keys of other devices), and/or changes encryption algorithms at 855. The private keys generated by the client device 10 are stored in its secure memory. The public keys are transmitted 860 to the proxy system 80, which then updates 865 the distributed ledger with the new keys. The transmission 865 may also include a request for UIDs of associated devices (paired client devices, user devices, administrator device) and their public keys, since the public keys in their possession for the client device 10 will now be out of date, and the client device 10 may have wiped its key store. The UIDs and keys are returned in a response 870. As noted above, the request for UIDs and keys, since it does not change the state of the distributed ledger by itself, may be made of the static copy of the distributed ledger, if one is available. Subsequently the proxy system 80 sends public keys of other devices 875 to the client device 10 for storage in its key store, and distributes the client device's new public key(s) to associated devices 880.

A variant incorporating a crypto-agility action is a warranty action, in which a client device 10, perhaps on determination that the client device 10 has been compromised. The action is termed a "warranty" action because the it effectively provides a replacement or repair of the compromised client device 10 because, aside from physical damage, the warranty action resets the client device 10 to nearly its original state, as of the time the client device 10 was initially onboarded by the proxy system 80.

Figure 15:
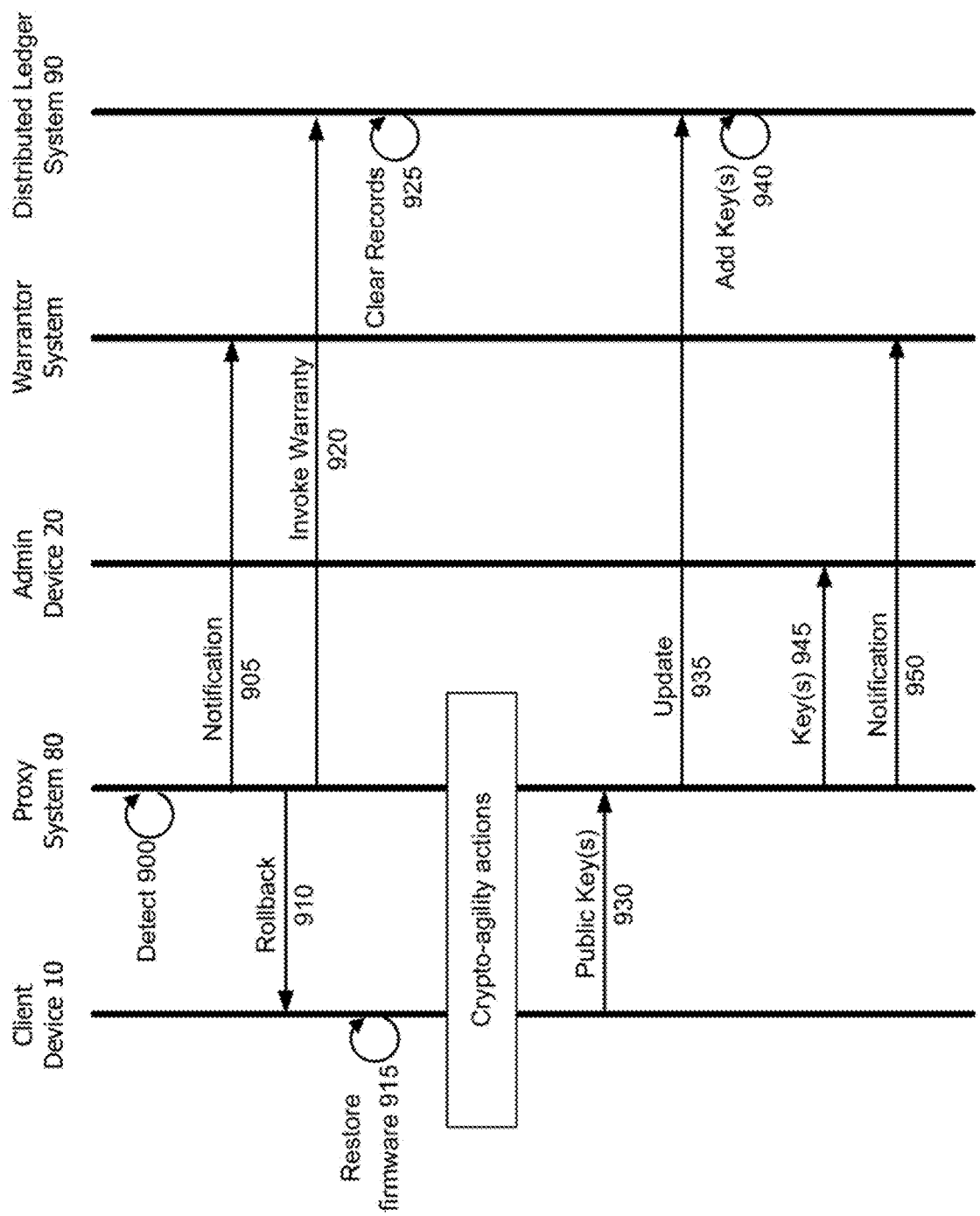
FIG. 15 is a sequence diagram illustrating a high level process for invoking a warranty action on the client device.

An example process for implementing a warranty action is shown in FIG. 15. The warranty action occurs on detection of a compromise or attack 900, or a determination that the warranty action should be invoked at the proxy system 80. Optionally, at this time a notification may be transmitted to a warrantor computing system for the warrantor's own records. The proxy system 80 also transmits an instruction 910 to the client device 10 to roll back its firmware to an earlier version 915, i.e. the version with which the client device was provided at the time of initialization. The earlier version may be stored as a backup on the client device 10 or in the proxy system 80, or alternatively the earlier version is retrieved from the firmware source 40 and provided to the client device 10. The firmware may be subsequently updated using update procedures known in the art.

The proxy system 80 also invokes a warranty function or smart contract in the distributed ledger 920. Execution 925 of the warranty function may determine what crypto-agility actions should be carried out by the client device 10, and also clears any stored keys for the client device 10, pairings with other client devices, and associations with user devices 21 (e.g., by adding a new transaction for the client device 10 in which any pairing/user device information is deleted). It should be noted that because the UID generated at the time of onboarding (see FIG. 9) was written into non-erasable memory, even though the firmware is rolled back the UID for the client device 10 remains the same. Furthermore, in the warranty action, the association between the client device 10 and the administrator device 20 is maintained, since the client device 10 presumably remains under the control of the same owner/operator, and an administrator device 20 will be required to reconfigure the client device 10.

The proxy system 80 then instructs the client device 10 to carry out any crypto-agility actions determined by the warranty smart contract. This can include the actions described above with reference to FIG. 14, although the administrator public key may be retained in the client device 10's key store. The crypto-agility actions include regeneration of the public/private key pair(s) required for the client device 10; the public key(s) are transmitted 930 to the proxy system 80. The proxy system 80 in turn sends the key(s) to be added to the distributed ledger 935, which is done in a new transaction 940. Additionally, since the administrator device 20 may need the new public key(s) for the client device 10, the key(s) may be transmitted 945 to the administrator device 20 as well. Finally, at 950, a notification of completion of the warranty action may be transmitted to the warrantor computer system.

It may be necessary, from time to time, to change the administrator device 20 associated with a client device 10. This may occur when the owner/operator of the client device 10 wishes to transfer administrative functions to a newly acquired smartphone, or the owner of the client device 10 enters into an agreement to transfer or sell the client device 10 to another party.

Figure 16:
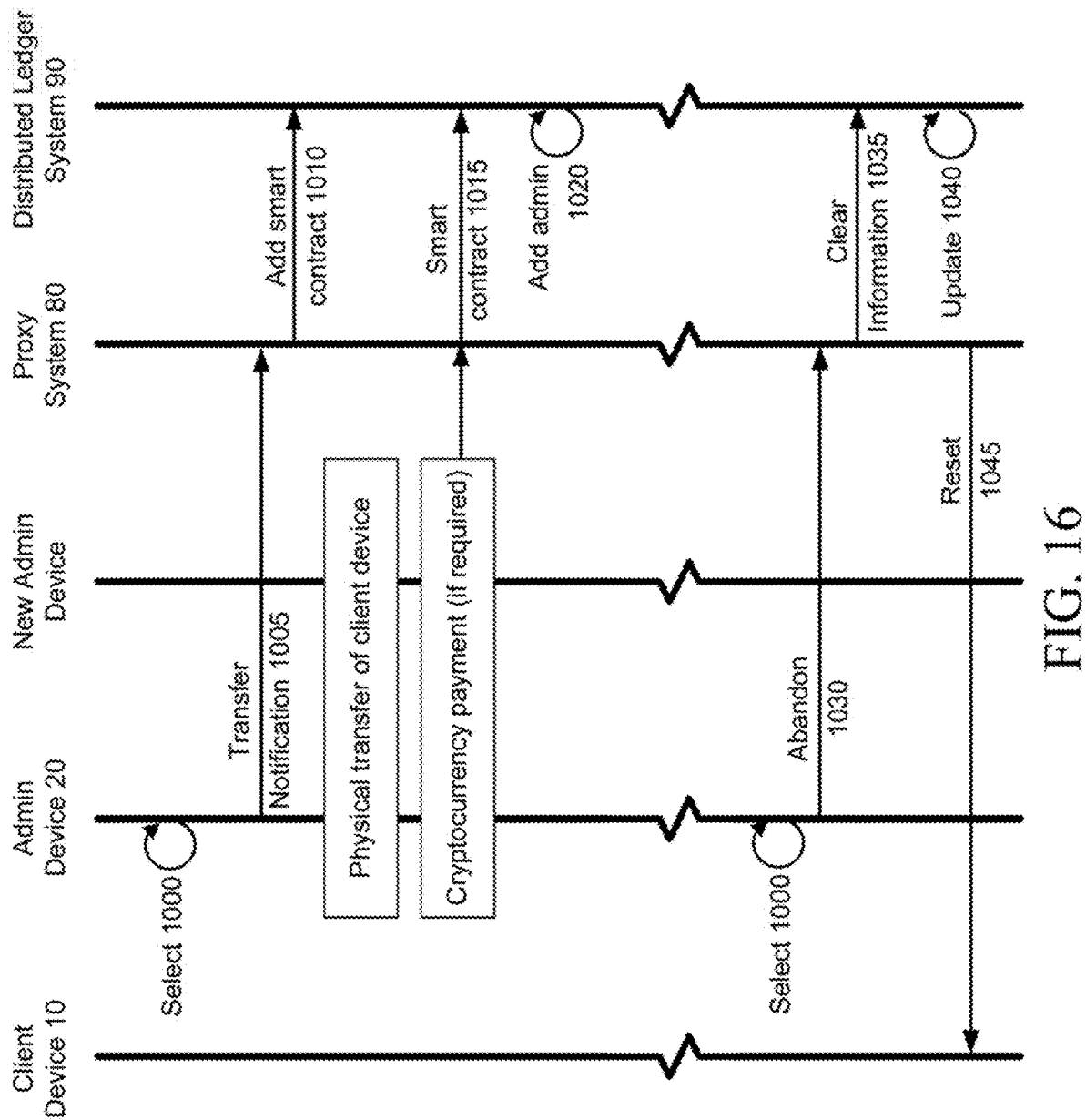
FIG. 16 is a sequence diagram illustrating high level processes for transferring a client device to another owner/administrator, and relinquishing or abandoning a client device.

FIG. 16 illustrates a high level process for a transfer. The process is initiated by the current administrator device 20, for example by selecting 1000 an option to transfer the client device. There may be different transfer options: the transfer may simply be a change to the communication/data processing device serving as the administrator device 20, with no change of ownership or control over the client device 10, in which case it would be desirable to maintain current device pairings and other security information for the client device 10; or, the transfer may be a change in custody of the client device 10, in which case it would be desirable to clear device pairings and other security information once the transfer is confirmed.

It should be noted that before the new administrator device can assume the administrator role for the client device 10, it must also install the device control application, and generate its own UID. If the UID is known to the current administrator device 20 (for example, if the two devices are in proximity), the current administrator device 20 may acquire the new administrator device's UID (e.g., by scanning a displayed 2D barcode, by NFC, by manual input, etc.) and include the new administrator device's UID in the notification 1005. This may be the case when an owner/operator of a client device 10 is simply transferring the administrator role to another personal communication device that they own, or if the owner/operator and transferee are co-located. In that case, the proxy system generates and transmits a new transaction with a smart contract 1010 to the distributed ledger, referencing the UIDs of both the current and the new administrator devices. No physical transfer or payment need be made in this case. Therefore, the proxy system 80 invokes the smart contract, causing the distributed ledger to update the association of the client device 10 with the UID of the new administrator device at 1020. With the addition of a new administrator device for the client device 10, a similar process to that depicted in FIG. 11 will follow, with the new administrator device providing its public key(s) to the proxy system 80, and the proxy system 80 providing the public keys for the new administrator device and client device to the other device.

If the transfer is a sale, the smart contract 1010 will include a value to be paid by the purchaser. The price may be established by the owner of the client device 10 or on agreement between the owner and the purchaser and input at the time of selection 1000. Alternatively, a resale price for the client device may be determined in advance and stored in the device control application or in the distributed ledger. The resale price may even be automatically adjusted to account for typical wear and tear, and even taking into account the actual usage of the device based on sensor and/or operational data generated by the device. The notification of transfer 1005 to the proxy system 80 will therefore include the price.

The client device 10 is then transferred to the custody of the transferee or purchaser, if necessary, and if applicable, the payment is made. These actions can occur "offline", so to speak, as the transfer may be physical or legal, and not programmatic. The payment may be made using conventional methods rather than using cryptocurrency. In any case, the purchaser or the seller will need to provide an electronic form of proof of payment to the proxy system 80 so that the proxy system 80 will trigger the execution of the smart contract 1015. Since the distributed ledger system 90 is accessible only to the proxy system 80, the purchaser cannot transact with the seller using the same distributed ledger that manages security information for the client device 10. In one alternative, the administrator device 20, proxy system 80, and new administrator device may be associated with accounts on a different distributed ledger that is limited to processing payment transactions between parties, which also identifies parties by UID. The account associated with the new administrator device may make a cryptocurrency payment to the current administrator device 20. Because the proxy system 80 has access, it can monitor the separate distributed ledger for new transactions to verify that the payment was made before invoking the smart contract 1015. In this case, the current pairing information and other security information for the client device 10 is deleted, since a new owner is responsible for the client device 10. The process then continues generally as described above. In this process, it may be noted that the client device 10 is continually associated with an administrator device 10; the UID of the administrator device 10 changes on execution of the smart contract at 1020.

In some instances, the UID of the new administrator's device may not be known, but a price has been set in the smart contract. This may be the case where the purchaser or transferee is physically remote from the current administrator device 20. In that case, the proxy system 80 may be configured to accept the first proof of payment of the established price that it receives from any party. Alternatively, since the current administrator device 20 remains the current administrator device 20 until the smart contract is executed at 2020, the proxy system 80 may simply await a manually triggered notification from the administrator device 20 of the UID of the new administrator device (not shown in FIG. 16), once the seller receives the payment and the new administrator device's UID.

In other circumstances, the user of the administrator device 20 may wish to immediately relinquish its administrator role, even if there is no other device available to assume the administrator role. This may occur, for example, when the client device 10 is decommissioned, or offered for sale without an immediate buyer without a set price. FIG. 16 also briefly illustrates a process for abandoning a client device 10. It will be appreciated that the process resembles a warranty action, in that pairings and associations with user devices, and client device keys, are removed from the distributed ledger. However, abandonment further removes the relationship between the administrator device 20 and the client device 10. At 1000, the user of the administrator device 20 selects an option to abandon the client device 10. The request 1030 is sent to the proxy system 80, which invokes a function 1035 on the distributed ledger to clear all information concerning the client device 10 besides its UID; thus, all pairings, keys, and associations with other devices are cleared by adding a new transaction to the distributed ledger removing this information. Of course, as the distributed ledger is a permanent record of all transactions, this information may be preserved in the distributed ledger, but is no longer current. This clearing function is executed at 1040. In addition, the proxy system 80 sends an instruction 1045 to the client device 10 to delete any information it stores, such as pairings and public keys of other devices. The proxy system 80 may also require the client device 10 to implement a crypto-agility function such as regeneration of keys.

The examples and embodiments are presented only by way of example and are not meant to limit the scope of the subject matter described herein. Each example embodiment presented above may be combined, in whole or in part, with the other examples. Some steps or acts in a process or method may be reordered or omitted, and features and aspects described in respect of one embodiment may be incorporated into other described embodiments. As one example, in the implementations described above the distributed ledger and/or its external data store maintained information about device pairings and associated user and administrator devices, as well as public keys and UIDs. In a minimal implementation, the distributed ledger may be used only to store UIDs and their associated public keys. Records of paired devices, users, and administrators may instead be maintained by the proxy system 80 in its data storage system 85. Thus, rather than search the distributed ledger or the static copy of the distributed ledger to retrieve information about pairings, the proxy system 80 may simply query its own data store to retrieve the needed information. Those skilled in the art implementing the systems and methods described herein may choose to store a greater or lesser amount of information in the distributed ledger, pushing storage of any information not recorded in the distributed ledger down to the proxy system 80.

Further, variations of these examples will be apparent to those in the art and are considered to be within the scope of the subject matter described herein.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object, applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. As will be appreciated by those skilled in the art, where appropriate, functional units need not be physically located together, but may reside in different locations, such as over several electronic devices or memory devices, capable of being logically joined for execution. Functional units may also be implemented as combinations of software and hardware, such as a processor operating on a set of operational data or instructions.

Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein.

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent Office records, but otherwise reserves all rights whatsoever.

The invention claimed is:

1. A method for configuring a networking device, the method comprising:
   storing, in a distributed ledger, a smart contract defining network configuration information for the networking device, the networking device being in an unconfigured state when initially deployed in a network;
   registering the networking device in the distributed ledger;
   receiving, from a proxy system associated with the networking device, a request on behalf of the networking device to invoke the smart contract;
   executing the smart contract; and
   transmitting output from execution of the smart contract to the proxy system for forwarding to the networking device, the output comprising the network configuration information for the networking device.

2. The method of claim 1, wherein the proxy system comprises a computing system configured to exchange security-related messages with the networking device over a first communication path, and to engage in transactions or call functions with the distributed ledger on behalf of the networking device over a second communication path.

3. The method of claim 1, further comprising:
   storing, in the distributed ledger, a further smart contract to the distributed ledger altering the network configuration information;
   executing the smart contract; and
   transmitting output from execution of the smart contract to the proxy system for forwarding to the networking device, the output comprising altered network configuration information for the networking device.

4. The method of claim 1, wherein the networking device is comprised in a first set of networking devices and a second networking device is comprised in a second set of networking devices, the first set and the second set comprising a same type of networking devices, and wherein the smart contract defines network configuration information for networking devices in each of the first set and the second set, the method further comprising:
   after the second networking device is deployed in the network, registering the second networking device in the distributed ledger and executing the smart contract; and
   transmitting output from execution of the smart contract to the proxy system for forwarding to the second networking device, the output comprising the network configuration information for the second networking device,
   wherein the network configuration information for the networking device and the network configuration information for the second networking device are different.

5. The method of claim 1, wherein the network configuration information comprises at least one of a traffic policy, a quality of service policy, a network address, an Address Resolution Protocol table, or a routing table.

6. A networked computing system implementing a distributed ledger, comprising:
   at least one processor device configured to:
      store, in the distributed ledger, a smart contract defining network configuration information for a networking device, the networking device being in an unconfigured state when initially deployed in a network;
      register the networking device in the distributed ledger;
      receive, from a proxy system associated with the networking device, a request on behalf of the networking device to invoke the smart contract;
      execute the smart contract; and
      transmit output from execution of the smart contract to the proxy system for forwarding to the networking device, the output comprising the network configuration information for the networking device.

7. The networked computer system of claim 6, wherein the proxy system comprises a computing system configured to exchange security-related messages with the networking device over a first communication path, and to engage in transactions or call functions with the distributed ledger on behalf of the networking device over a second communication path.

8. The networked computer system of claim 6, wherein the at least one processor is further configured to:
   store, in the distributed ledger, a further smart contract altering the network configuration information;
   execute the smart contract; and
   transmit output from execution of the smart contract to the proxy system for forwarding to the networking device, the output comprising altered network configuration information for the networking device.

9. The networked computer system of claim 6, wherein the networking device is comprised in a first set of networking devices and a second networking device is comprised in a second set of networking devices, the first set and the second set comprising a same type of networking devices, and wherein the smart contract defines network configuration information for networking devices in each of the first set and the second set, the at least one processor being further configured to:
   after the second networking device is deployed in the network, register the second networking device in the distributed ledger and execute the smart contract; and
   transmit output from execution of the smart contract to the proxy system for forwarding to the second networking device, the output comprising the network configuration information for the second networking device,
   wherein the network configuration information for the networking device and the network configuration information for the second networking device are different.

10. The networked computer system of claim 6, wherein the network configuration information comprises at least one of a traffic policy, a quality of service policy, a network address, an Address Resolution Protocol table, or a routing table.

11. Non-transitory computer-readable media storing code which, when executed by a networked computing system implementing a distributed ledger, causes the networked computing system to:
   store, in the distributed ledger, a smart contract defining network configuration information for a networking device, the networking device being in an unconfigured state when initially deployed in a network;
   register the networking device in the distributed ledger;
   receive, from a proxy system associated with the networking device, a request on behalf of the networking device to invoke the smart contract;
   execute the smart contract; and
   transmit output from execution of the smart contract to the proxy system for forwarding to the networking device, the output comprising the network configuration information for the networking device.

12. A method implemented in a networking device, the method comprising:
   after deployment in a network, requesting registration of the networking device in a distributed ledger maintained in a distributed ledger platform, the networking device being in an unconfigured state when initially deployed in the network;
   causing invocation of a smart contract in the distributed ledger, comprising transmitting a request to a proxy service, the proxy service being configured to invoke the smart contract on behalf of the networking device;
   receiving, from the proxy service, network configuration information, wherein the network configuration information is output from execution of the smart contract; and
   applying the received network configuration information.

13. The method of claim 12, wherein the network configuration information comprises at least one of a traffic policy, a quality of service policy, a network address, an Address Resolution Protocol table, or a routing table.

14. The method of claim 12, wherein the proxy system comprises a computing system configured to exchange security-related messages with the networking device over a first communication path, and to engage in transactions or call functions with the distributed ledger on behalf of the networking device over a second communication path.

15. The method of claim 12, further comprising, prior to requesting registration in the distributed ledger:
   in response to an initial boot of the networking device, contacting a firmware source at a server system to obtain firmware for the networking device;

receiving the firmware from the firmware source;
installing the firmware on the networking device; and
executing the firmware to generate information for use in requesting registration of the networking device.

16. A networking device, comprising:
a processor device configured to:
after deployment of the networking device in a network, request registration of the networking device in a distributed ledger maintained in a distributed ledger platform, the networking device being in an unconfigured state when initially deployed in the network;
cause invocation of a smart contract in the distributed ledger, comprising transmitting a request to a proxy service, the proxy service being configured to invoke the smart contract on behalf of the networking device;
receive, from the proxy service, network configuration information, wherein the network configuration information is output from execution of the smart contract; and
apply the received network configuration information.

17. The networking device of claim 16, wherein the proxy system comprises a computing system configured to exchange security-related messages with the networking device over a first communication path, and to engage in transactions or call functions with the distributed ledger on behalf of the networking device over a second communication path.

18. The networking device of claim 16, wherein the processor device is further configured to, prior to requesting registration in the distributed ledger:
in response to an initial boot of the networking device, contact a firmware source at a server system to obtain firmware for the networking device;
receive the firmware from the firmware source;
install the firmware on the networking device; and
execute the firmware to generate information for use in requesting registration of the networking device.

19. Non-transitory computer-readable media storing code which, when executed by a networking device, causes the networking device to:
after deployment of the networking device in a network, request registration of the networking device in a distributed ledger maintained in a distributed ledger platform, the networking device being in an unconfigured state when initially deployed in the network;
cause invocation of a smart contract in the distributed ledger, comprising transmitting a request to a proxy service, the proxy service being configured to invoke the smart contract on behalf of the networking device;
receive, from the proxy service, network configuration information, wherein the network configuration information is output from execution of the smart contract; and
apply the received network configuration information.

20. The non-transitory computer-readable media of claim 19, wherein the proxy system comprises a computing system configured to exchange security-related messages with the networking device over a first communication path, and to engage in transactions or call functions with the distributed ledger on behalf of the networking device over a second communication path.

21. The non-transitory computer-readable media of claim 19, wherein the networking device is further caused to, prior to requesting registration in the distributed ledger:
in response to an initial boot of the networking device, contact a firmware source at a server system to obtain firmware for the networking device;
receive the firmware from the firmware source;
install the firmware on the networking device; and
execute the firmware to generate information for use in requesting registration of the networking device.

* * * * *